(12) United States Patent
Choi et al.

(10) Patent No.: US 7,808,604 B2
(45) Date of Patent: Oct. 5, 2010

(54) LIQUID CRYSTAL DISPLAY DEVICE OF IN-PLANE SWITCHING MODE, METHOD OF FABRICATING THE SAME, AND METHOD OF DRIVING THE SAME

(75) Inventors: Su Seok Choi, Seongnam-si (KR); Ku Hyun Park, Ulwang-si (KR)

(73) Assignee: LG. Display Co., Ltd., Seoul (KR)

( * ) Notice: Subject to any disclaimer, the term of this patent is extended or adjusted under 35 U.S.C. 154(b) by 0 days.

(21) Appl. No.: 12/253,546

(22) Filed: Oct. 17, 2008

(65) Prior Publication Data

US 2009/0102993 A1      Apr. 23, 2009

(51) Int. Cl.
*C09K 19/02*      (2006.01)
(52) U.S. Cl. .................. 349/186; 349/185; 349/141; 349/142
(58) Field of Classification Search .......... 349/185–186
See application file for complete search history.

(56) References Cited

U.S. PATENT DOCUMENTS

| | | | |
|---|---|---|---|
| 5,317,429 A | 5/1994 | Mochizuki et al. | |
| 6,344,889 B1 | 2/2002 | Hasegawa et al. | |
| 6,417,907 B2 | 7/2002 | Choi et al. | |
| 6,549,255 B2 | 4/2003 | Stebler et al. | |
| 7,215,400 B2 | 5/2007 | Choi | |
| 2005/0140898 A1* | 6/2005 | Choi | 349/141 |
| 2005/0140904 A1 | 6/2005 | Choi | |
| 2006/0126000 A1 | 6/2006 | Choi et al. | |

* cited by examiner

*Primary Examiner*—David Nelms
*Assistant Examiner*—Phu Vu
(74) *Attorney, Agent, or Firm*—Brinks Hofer Gilson & Lione

(57) ABSTRACT

An in-plane switching mode liquid crystal display device includes upper and lower substrates, first and second ferroelectric liquid crystal layers, a nematic system crystal layer, and first and second electrodes. The electrodes and liquid crystal layers are located between the substrates, with the nematic liquid crystal layer between the ferroelectric liquid crystal layers. The ferroelectric liquid crystal layers have different spontaneous polarization directions. An electric field is applied to the liquid crystal layers using the electrodes. The ferroelectric liquid crystal layers react to different electric field to conduct an in-plane driving of liquid crystal molecules in the nematic liquid crystal layer.

3 Claims, 27 Drawing Sheets

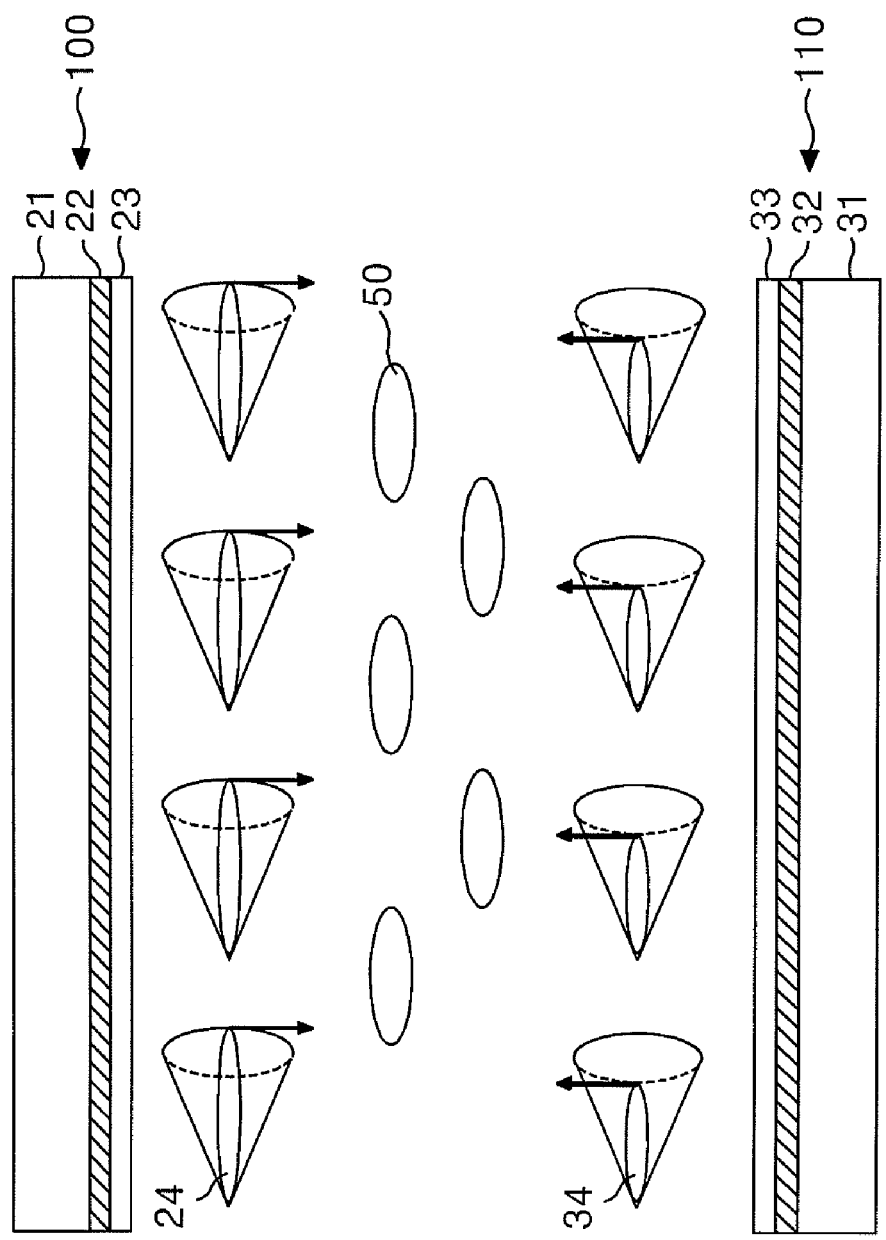

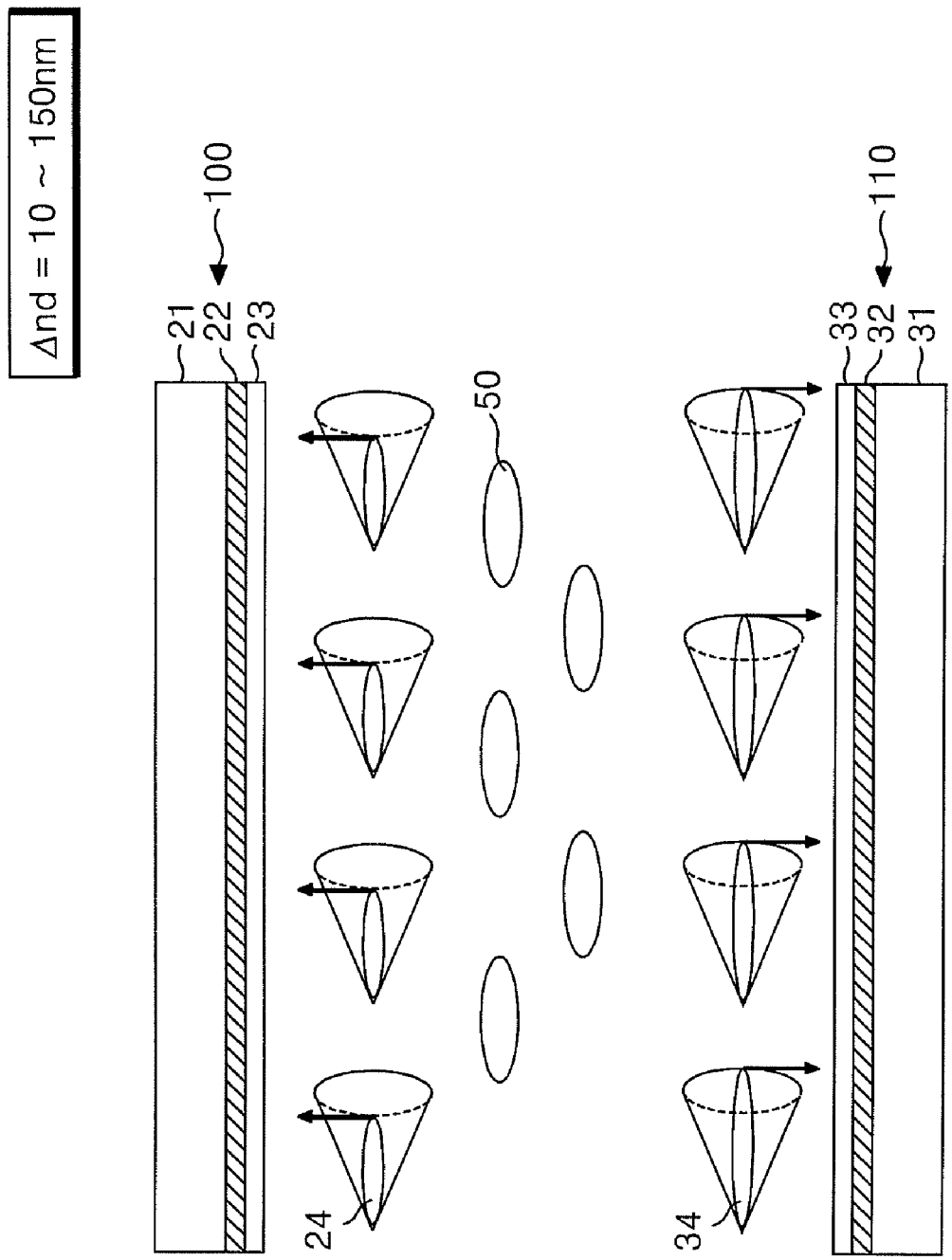

AMPHIPHOBIC MEDIUM

54

AMPHIPHILIC MEDIUM

53

FIG.14
AMPHIPHILIC MEDIUM HAVING A HIGH
ELECTRIC NEGATIVITY
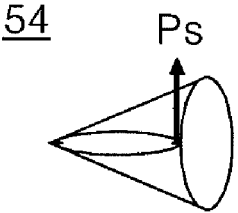 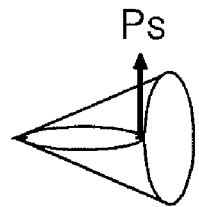 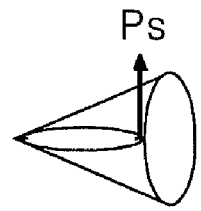 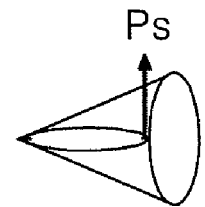
54
AMPHIPHILIC MEDIUM HAVING A LOW
ELECTRIC NEGATIVITY
53

FIG.16
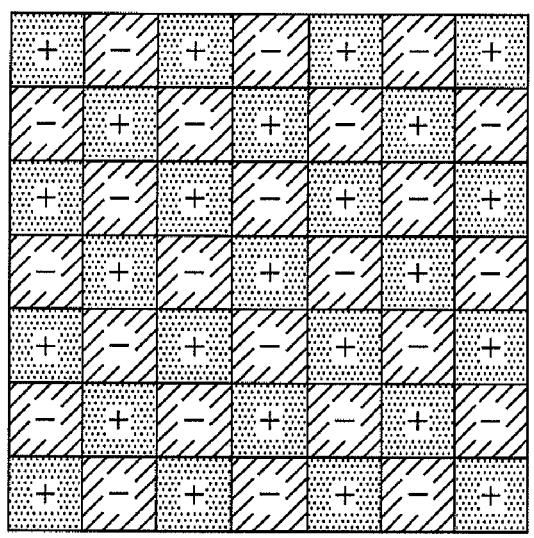
<ADD FRAME>
▦ LIGHT TRANSMISSION
▨ LIGHT INTERCEPTION
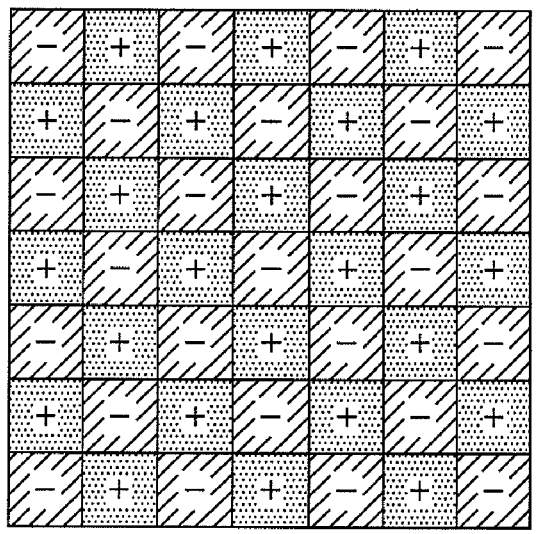
<EVEN FRAME>
▦ LIGHT TRANSMISSION
▨ LIGHT INTERCEPTION

FIG.17
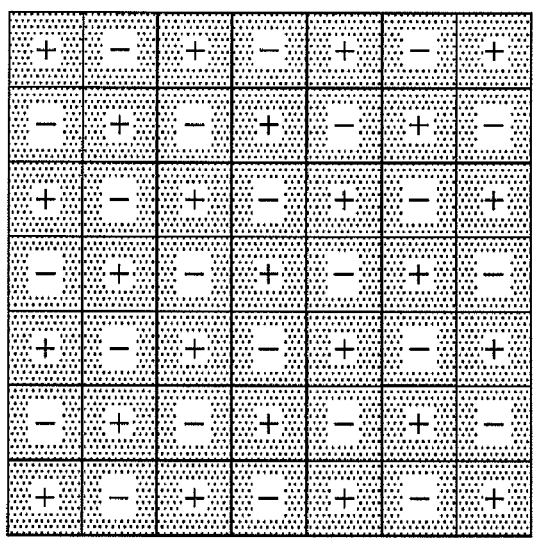
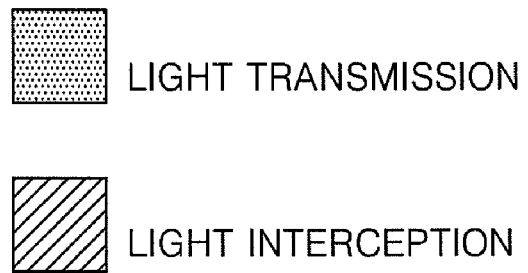
<ADD FRAME>
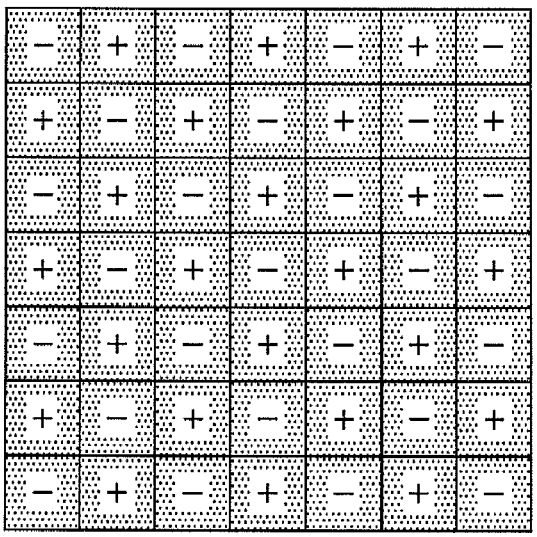
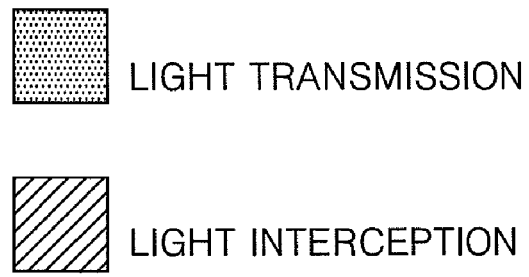
<EVEN FRAME>

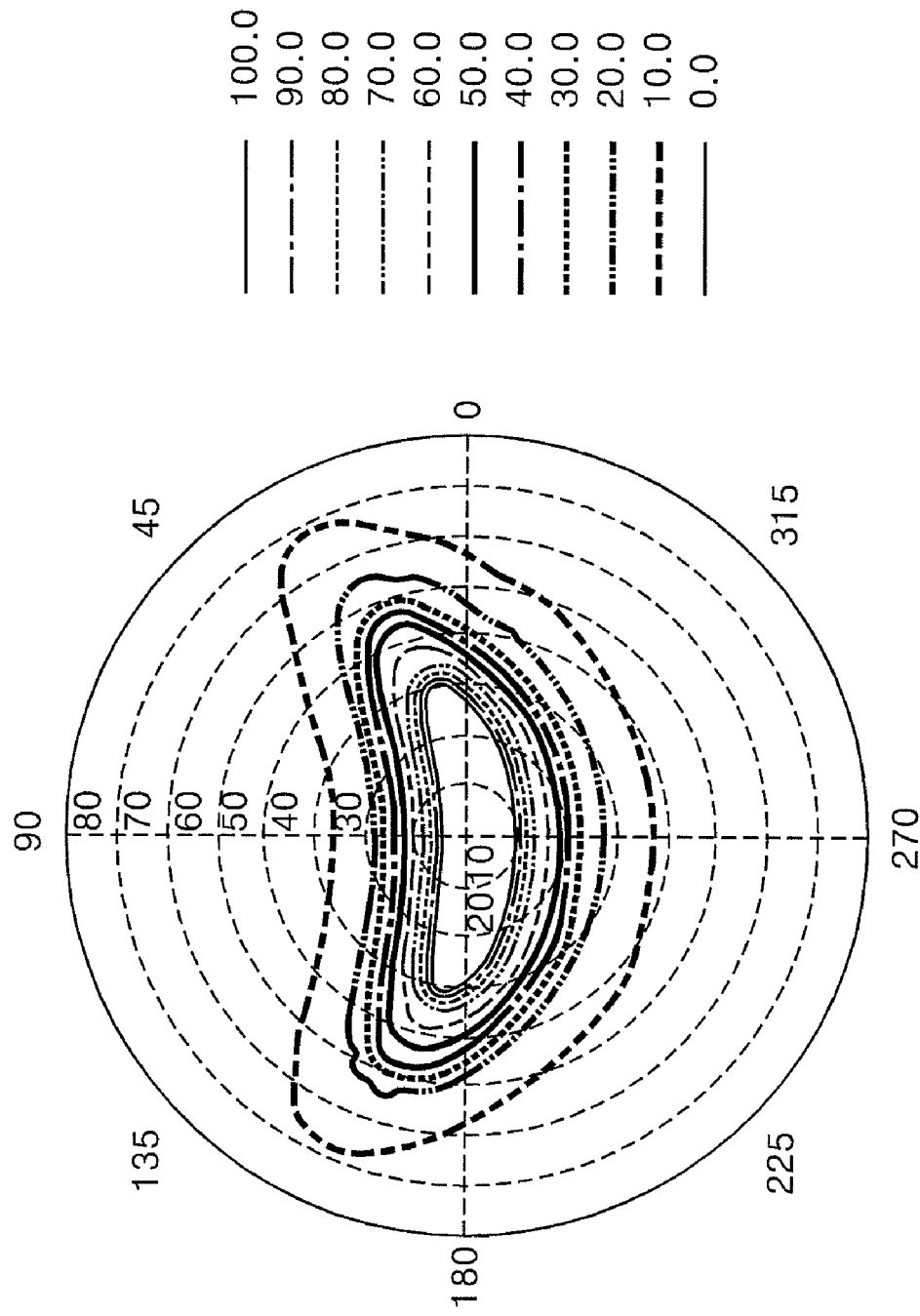

LIQUID CRYSTAL DISPLAY DEVICE OF IN-PLANE SWITCHING MODE, METHOD OF FABRICATING THE SAME, AND METHOD OF DRIVING THE SAME

PRIORITY CLAIM

This application claims priority to patent application Ser. No. 11/091,199, which claims the benefit of Korean Patent Application No. P2004-21127 filed in Korea on Mar. 29, 2004, and Korean Patent Application No. P2004-21985 filed in Korea on Mar. 31, 2004, which are hereby incorporated by reference.

TECHNICAL FIELD

The present application relates to a liquid crystal display device of in-plane switching mode, a method of fabricating the same, and a method of driving the same, and more particularly, to a liquid crystal display device of in-plane switching mode, a method of fabricating the same, and a method of driving the same that is possible to improve an aperture ratio and to reduce a light leakage without a compensation film.

DESCRIPTION OF THE RELATED ART

A related art liquid crystal display (LCD) device controls an electric field applied to a liquid crystal cell and modulates light incident to the liquid crystal cell to thereby display a picture. A liquid crystal material injected into the liquid crystal display device is in between a solid and a liquid, having both fluidity and elasticity.

Presently, most frequently used the liquid crystal mode of the liquid crystal display device is a twisted nematic (TN) mode, driven by a vertical electric field scheme. The TN mode has a relatively high aperture ratio. However, implementation of a wide viewing angle is difficult because the refractive index of the liquid crystal material, which an observer senses in accordance with the viewing angle, is substantially difficult. In addition, the response speed of the liquid crystal material is slow.

An in-plane switching (IPS) mode is representative of a horizontal electric field scheme. In the IPS mode, an electric field is formed between electrodes formed on a substrate, and liquid crystal molecules are driven by the electric field.

FIG. 1 is a sectional view illustrating a related art liquid crystal panel of in-plane switching mode.

Referring to FIG. 1, the related art in-plane switching mode liquid crystal display panel includes upper and lower substrates 12 and 18, which are combined by a sealant (not shown), and upper and lower polarizing plates 11 and 19, which are respectively located at a rear surface of the upper and lower substrates 12 and 18.

On the upper substrate 12, a color filter and a black matrix, etc., are formed. On the lower substrate, a pixel electrode 16 is formed in parallel to a common electrode 15, and an electric field 20 of the horizontal direction is formed by a difference of voltages applied in between the electrodes 15 and 16. Liquid crystal molecules 14 are rotated within a surface direction of the substrate by the electric field 20 to modulate a polarization component of light transmitting a liquid crystal layer.

As shown in FIGS. 2A and 2B, light transmitting axes of the upper/lower polarizing plates 11 and 19 are crossed vertically each other. In other words, if the light transmitted through the liquid crystal layer is changed into linearly polarized light, then the light passes through the upper polarizing plate 11 to progress toward an observer. On the other hand, if the polarization component of the light does not change when the light passes through the liquid crystal layer, then the light does not pass through the upper polarizing plate 11.

The upper polarizing plate 11 has a structure which first and second protective layers 11a and 11c are stacked with a polarizer 11b therebetween. The lower polarizing plate 19 has a structure which first and second protective layers 19a and 19c are stacked with a polarizer 19b therebetween.

The polarizers 11b and 19b are formed by stretching a poly vinyl alcohol film and soaking it in an iodine and a dichroic dye solution to arrange iodine molecules, in parallel, in a stretching direction.

The first and the second protective layers 11a, 11c, 19a and 19c are made of tri-acetyl cellulose TAC, etc. The first and the second protective layers 11a, 11c, 19a and 19c serve to prevent the oriented polarizers 11b and 19b from being shrunk and to protect the polarizers 11b and 19b.

When the liquid crystal panel shown in FIG. 1 implements black, light that has been linearly polarized by the lower polarizing plate 19 is not absorbed sufficiently by the upper polarizing plate 11, so that the amount and color of the light seen from a location out of a front surface of the liquid crystal display device, i.e., from a lateral surface may be differentiated as compared with the amount and color of light seen from the front surface of the liquid crystal display device. More particularly, as shown in FIGS. 3 and 4, when a viewing angle is ±70°, light transmittance is high. Accordingly, most of the light leakage occurs in these regions. This is because the first and the second protective layers 11a and 11c of the upper polarizing plate 11 are uni-axial and have a regular delay value to change a polarizing direction of the upper polarizing plate 11.

In order to reduce light leakage, as shown in FIG. 5, compensation films 7 and 9 such as A-plate, positive C-plate, biaxial film and the like are attached to the rear surface of each of the upper and lower substrates 12 and 18 together with the polarizing plate. Light leakage can be reduced by use of the compensation films 7 and 9, as shown in FIGS. 3 and 6.

However, the liquid crystal panel shown in FIG. 5 has a problem that cost increases due to the additional compensation films 7 and 9. Further, the stretching intensity is not applied uniformly over the entire area of the compensation films 7 and 9 upon stretching of the compensation films 7 and 9 applied for a large-dimension substrate.

Moreover, in the related art IPS mode liquid crystal display, since the electric field applied to the liquid crystal molecules 14 is bent on the pixel electrode 16 and the common electrode 15, switching of the light is not normally performed on the electrodes 15 and 16. As a result, the IPS mode liquid crystal display has a low aperture ratio.

SUMMARY

An in-plane switching mode liquid crystal display device, a method of fabricating the same, and a method of driving the same are provided with improved aperture ratio and reduced light leakage without a compensation film.

In one embodiment, the in-plane switching mode liquid crystal display device includes opposing substrates, opposing electrodes formed on the substrates, and a multilayer liquid crystal layer disposed between the electrodes. The multilayer liquid crystal layer contains opposing layers having a first type of liquid crystal molecules and a middle layer therebetween having a second type of liquid crystal molecules.

In another embodiment, a method of driving the liquid crystal display device includes applying an electric field to the opposing layers using the opposing electrodes and in-plane driving liquid crystal molecules in the middle layer by permitting one of the opposing layers to react to the electric field.

In another embodiment, a method of fabricating an in-plane switching mode liquid crystal display device includes forming an electrode and a first liquid crystal layer on each of an upper and lower substrate, exposing each first liquid crystal layer to an amphiphilic or amphiphobic medium, stabilizing each of the exposed first liquid crystal layers in a mono-stable state and providing a second liquid crystal layer between the stabilized first liquid crystal layers.

In any of the above embodiments, one or more of the following may be true: the opposing layers comprise ferroelectric liquid crystal molecules, the ferroelectric liquid crystal molecules comprise chiral smectic C phase liquid crystal molecules, the middle layer comprises nematic liquid crystal molecules, the opposing layers have different spontaneous polarization directions, liquid crystal molecules in the opposing layers react to electric fields formed by the opposing electrodes to produce in-plane driving of liquid crystal molecules in the middle layer, a phase difference value of each of the opposing layers is 10 nm to 150 nm, opposing alignment films are formed on the substrates, each of the opposing alignment films includes an amphiphilic medium or an amphiphobic medium, spontaneous polarization of each opposing layer is directed toward the alignment film most proximate or most distal to the opposing layer, only one of the opposing layers reacts to an applied electric field, the opposing layers react to electric fields of different polarities, the opposing layers are driven under half V-switching mode, a phase transition of each first liquid crystal layer causes the stabilization, each first liquid crystal layer undergoes multiple phase transitions before the second crystal layer is provided between the first liquid crystal layers, the stabilization occurs without an external electric field being applied to either of the first liquid crystal layers, a mixture of liquid crystal material and an organic solvent is applied to each substrate and the substrate is heated to a temperature sufficient to vaporize the organic solvent, and/or the liquid crystal material is cooled after the organic solvent is vaporized to produce a phase transition in the liquid crystal material (from an isotropic phase to a chiral smectic C phase possibly with a chiral nematic phase therebetween).

BRIEF DESCRIPTION OF THE DRAWINGS

The following detailed description of the embodiments of the present invention reference the accompanying drawings, in which:

FIG. 9 is a sectional view illustrating another type liquid crystal display panel different from the in-plane switching mode liquid crystal display panel shown in FIG. 8;

FIG. 10 is a configuration for explaining the phase difference value of a ferroelectric liquid crystal layer shown in FIGS. 7 and 8;

FIG. 14 is a configuration showing a ferroelectric liquid crystal material stabilized in a mono-stable state during a phase transition process of FIGS. 13A to 13D;

FIG. 16 is a configuration showing a liquid crystal panel, to which a ferroelectric liquid crystal layer of half V-switching mode is injected, driven by a dot inversion system;

FIG. 17 is a configuration showing a liquid crystal panel, in which a nematic system liquid crystal layer is put in between the ferroelectric liquid crystal layers of half V-switching mode as shown in FIG. 8 or FIG. 9, driven by a dot inversion system;

FIGS. 19A and 19B are configurations showing a viewing angle of a general twisted nematic mode liquid crystal display panel and the in-plane switching mode liquid crystal display panel according to one embodiment of the present invention, respectively;

DETAILED DESCRIPTION OF THE PREFERRED EMBODIMENT

Reference will now be made in detail to the preferred embodiments of the present invention, examples of which are illustrated in the accompanying drawings.

Hereinafter, the preferred embodiments of the present invention will be described in detail with reference to FIGS. 7 to 21.

Figure 1:
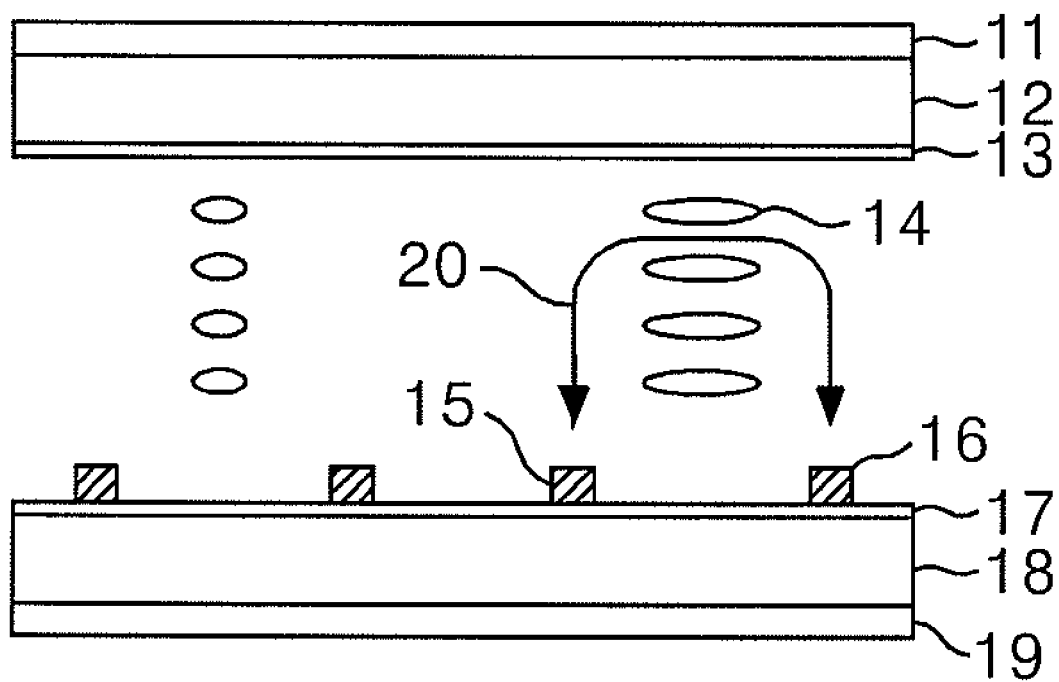
FIG. 1 is a schematically sectional view illustrating a related art liquid crystal panel of in-plane switching mode.
Figure 2A:
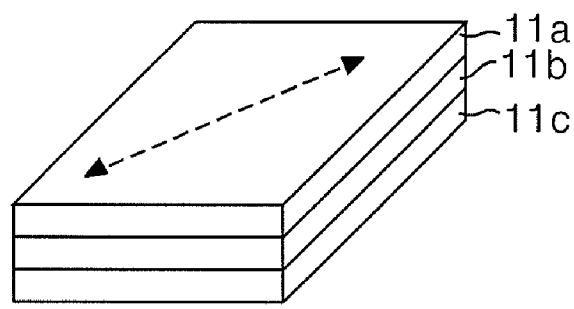
FIGS. 2A and 2B are plan views illustrating upper/lower polarizing plates shown in FIG. 1.
Figure 2B:
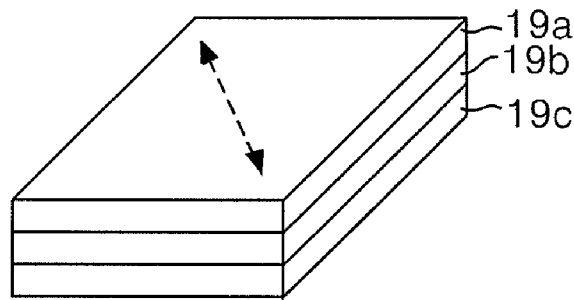
Figure 3:
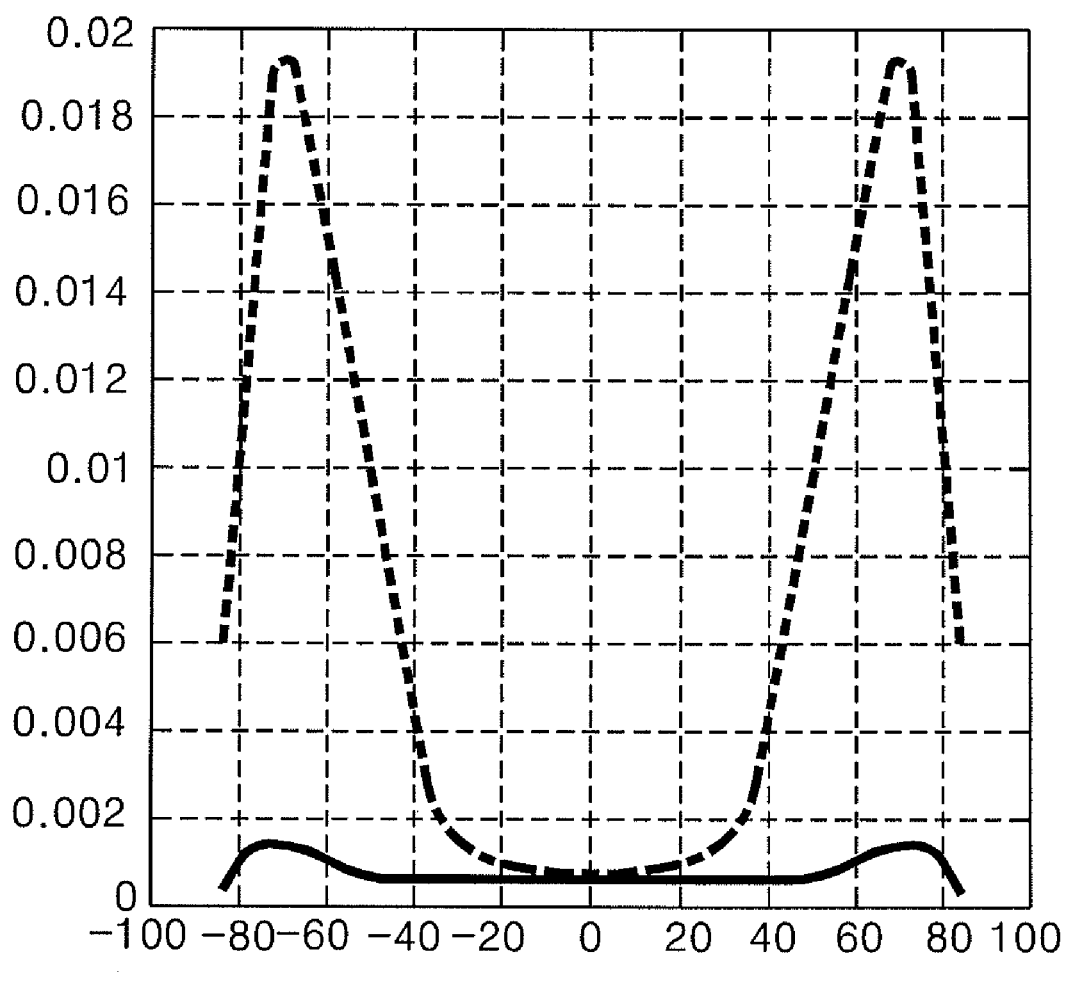
FIG. 3 is a graph showing a viewing angle property before using a related art compensation film, and after using the related art compensation film.
Figure 4:
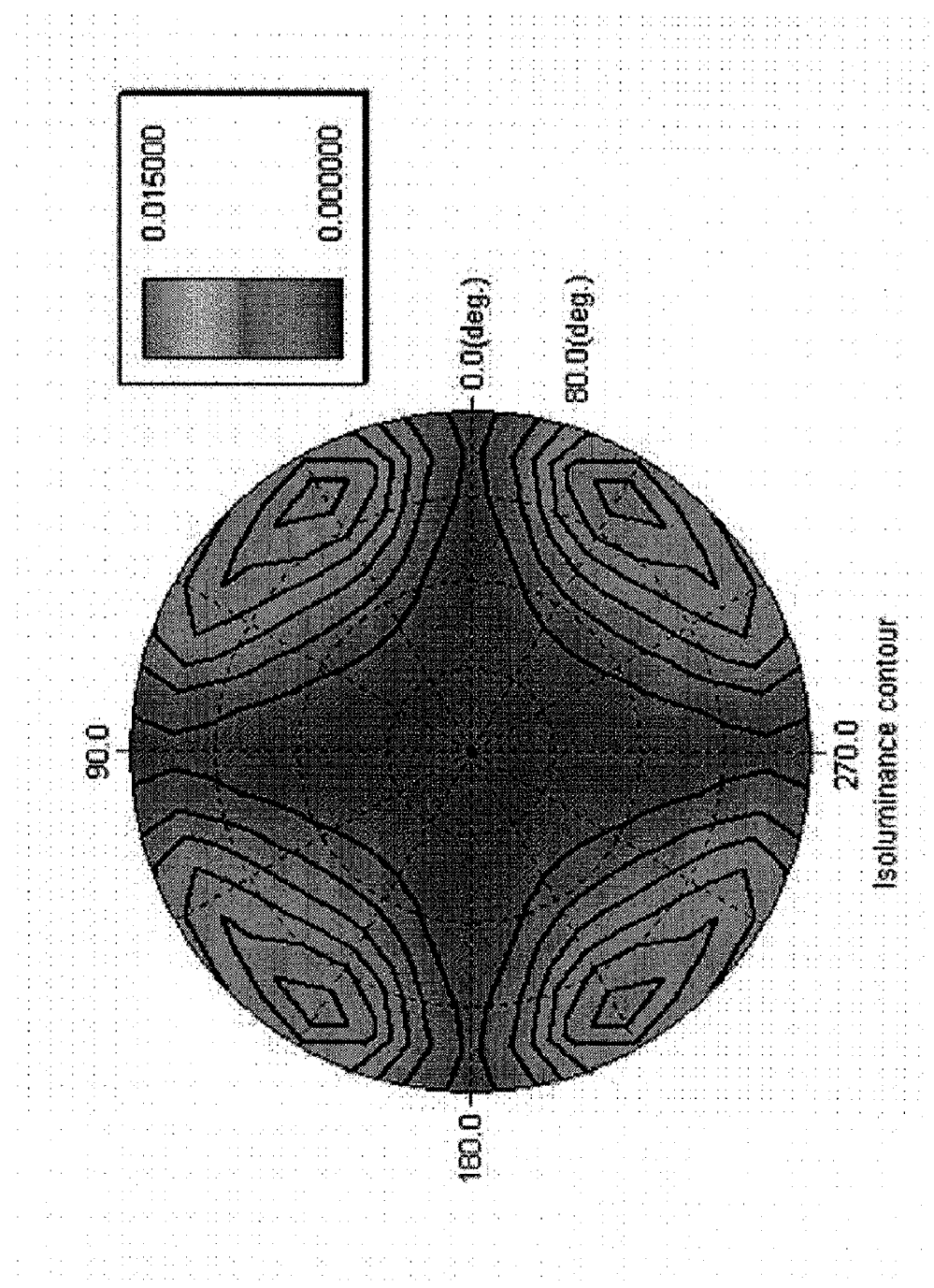
FIG. 4 is a configuration showing a viewing angle property of the liquid crystal display panel shown in FIG. 1.
Figure 5:
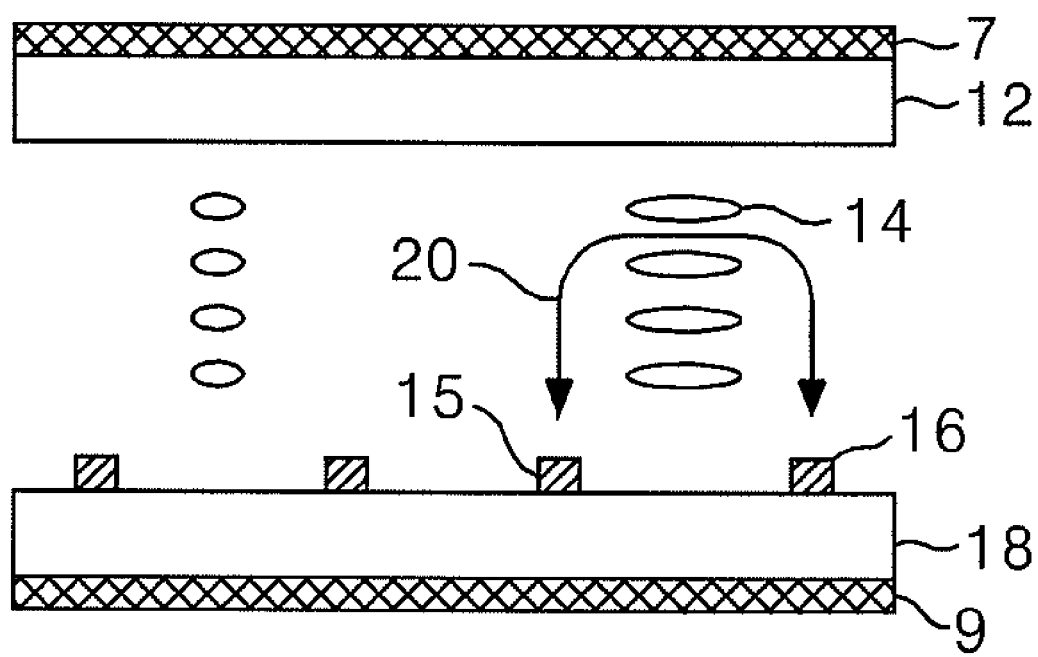
FIG. 5 is a sectional view illustrating the related art liquid crystal display panel having a compensation film.
Figure 6:
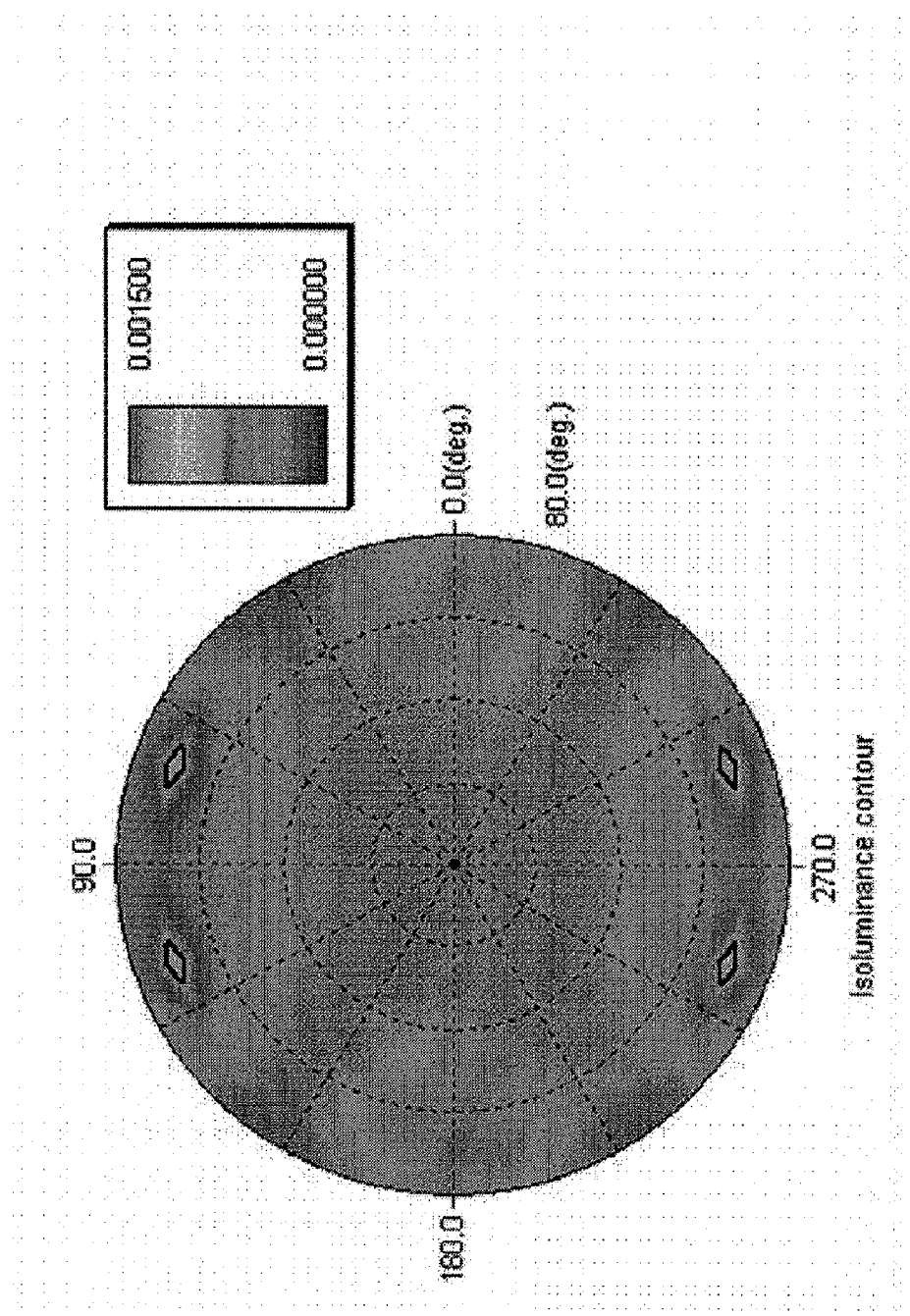
FIG. 6 is a configuration showing a viewing angle property of the liquid crystal display panel shown in FIG. 5.
Figure 7:
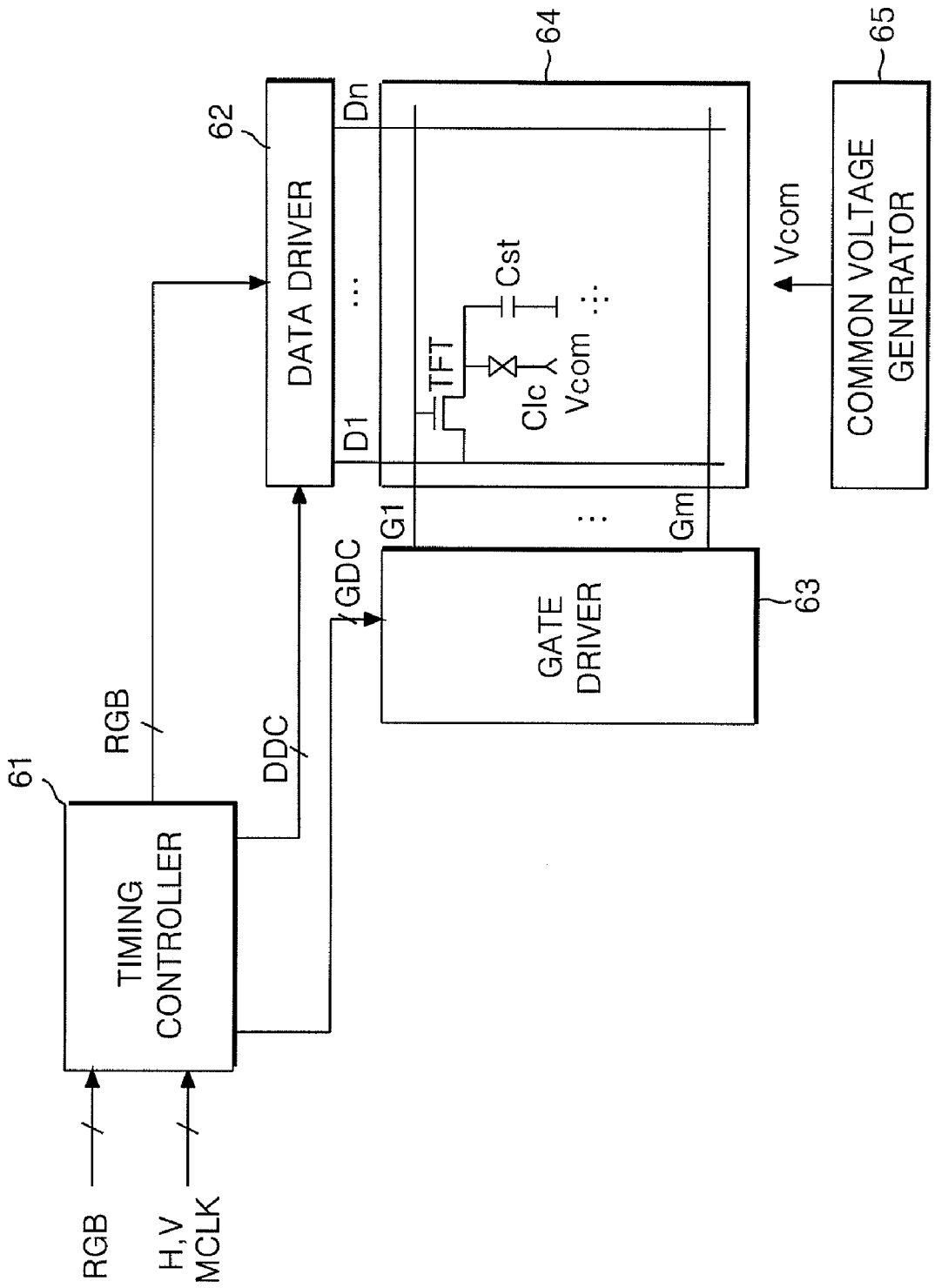
FIG. 7 is a block diagram showing an in-plane switching mode liquid crystal display device according to one embodiment of the present invention.

FIG. 7 is a block diagram showing an in-plane switching mode liquid crystal display device according to one embodiment of the present invention.

Referring to FIG. 7, the in-plane switching mode liquid crystal display device according to one embodiment of the present invention includes: a liquid crystal display panel 64 in which a nematic liquid crystal material is disposed between ferroelectric liquid crystal layers; a data driver 62 for driving a data line D of the liquid crystal display panel 64; a gate driver 63 for driving a gate line G of the liquid crystal display panel 64; a timing controller 61 for controlling the data driver 62 and the gate driver 63; and a common voltage generator 65 for applying a common voltage Vcom to a common electrode of the liquid crystal display panel 64.

The timing controller 61 supplies a pixel data signal R,G,B data applied from an exterior to the data driver 62. Further, the timing controller 61 generates a gate control signal GDC and a data control signal DDC in response to control signals H (horizontal period), V (vertical period), DE, and CLK (system clock) supplied from the exterior. Herein, the gate control signal GDC is for controlling the gate driver 63 and the data control signal DDC is for controlling the data driver 62.

The gate control signal GDC includes a gate start pulse GSP, a gate shift clock pulse GSC, a gate output enable signal GOE, and etc. The data control signal DDC includes a source start pulse SSP, a source shift clock signal SSC, a source output enable signal SOE, a polarity control signal POL, and etc.

The gate driver 63 sequentially applies a high gate voltage VGH to the gate lines GL1 to GLm in response to the gate control signal GDC from the timing controller 61. Accordingly, the gate driver 63 allows a thin film transistor TFT connected to the gate lines G1 to Gm to be driven by a gate line GL unit.

The data driver 62 applies pixel signals for each one horizontal line to the data lines DL1 to DLn every horizontal period (H1, H2, ... ) in response to the data signal DDC from the timing controller 61. More particularly, the data driver 62 converts digital pixel data R, G, and B from the timing controller 61 into analog pixel signals using a gamma voltage from a gamma voltage generator (not shown) to output them.

Figure 8:
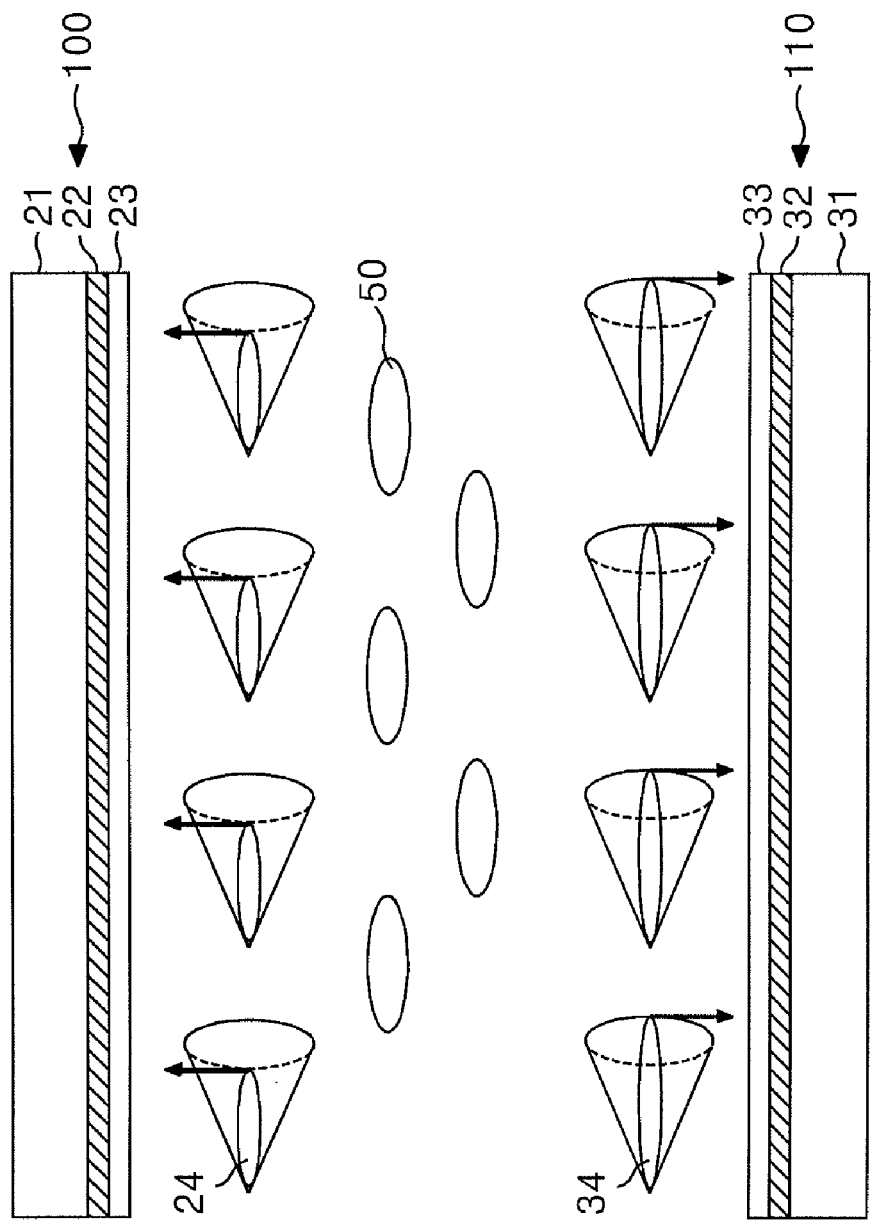
FIG. 8 is a sectional view illustrating the in-plane switching mode liquid crystal display panel shown in FIG. 7.

As shown in FIG. 8 or FIG. 9, the liquid crystal display panel 64 includes: an upper plate 100 and a lower plate 110, which are combined by a sealant (not shown); first and second ferroelectric liquid crystal layers 24 and 34 formed on the upper plate 100 and the lower substrate 110, respectively; and a nematic liquid crystal material 50 between the first and the second ferroelectric liquid crystal layers 24 and 34.

The upper plate 100 includes: an upper substrate 21; a color filter (not shown) for representing a color; a black matrix (not shown) for preventing light leakage; a common electrode 22 to which the common voltage Vcom generated from the common voltage generator 65 is applied; and an upper alignment film 23 applied to the common electrode 22 that aligns the first layer of ferroelectric liquid crystal molecules 24.

The lower substrate 110 includes: data lines (D1-Dn) to which data signals are supplied; gate lines (G1-Gm) to which gate signals are supplied; a thin film transistor (TFT) for switching liquid crystal cells at a crossing of the data lines and the gate lines; a pixel electrode 32 connected to the thin film transistor TFT to drive the liquid crystal cells; and a lower alignment film 33 applied to the pixel electrode 32 that aligns the second layer of ferroelectric liquid crystal molecules 34.

Polarizers (not shown) whose light transmitting axes are vertically crossed with each other are attached on a light incident surface of the lower substrate 110 and on a light exit surface of the upper substrate 100, respectively.

The first and the second ferroelectric liquid crystal layers 24 and 34 are driven in a half V-switching mode and their spontaneous polarization directions are different from each other.

For instance, as shown in FIG. 8, when the first ferroelectric liquid crystal layer 24 has the same spontaneous polarization direction as a negative polarity electric field direction, the second ferroelectric liquid crystal layer 34 has the same spontaneous polarization direction as a positive polarity electric field direction. At this time, the first ferroelectric liquid crystal layer 24 reacts to the positive polarity electric field, so that as the spontaneous polarization direction of the first ferroelectric liquid crystal material 24 is changed to the same direction as the positive polarity electric field direction, the first ferroelectric liquid crystal layer 24 is driven under in-plane switching. On the other hand, the second ferroelectric liquid crystal layer 34 reacts to the negative polarity electric field, so that as the spontaneous polarization direction of the second ferroelectric liquid crystal material 34 is changed to the same direction as the negative polarity electric field direction, the second ferroelectric liquid crystal layer 34 is driven under in-plane switching.

Otherwise, as shown in FIG. 9, when the first ferroelectric liquid crystal layer 24 has the same spontaneous polarization direction as the positive polarity electric field direction, the second ferroelectric liquid crystal layer 34 has the same spontaneous polarization direction as the negative polarity electric field direction. At this time, the first ferroelectric liquid crystal layer 24 reacts to the negative polarity electric field, so that as the spontaneous polarization direction of the first ferroelectric liquid crystal material 24 is changed to the same direction as the negative polarity electric field direction, the first ferroelectric liquid crystal layer 24 is driven under in-plane switching. On the other hand, the second ferroelectric liquid crystal layer 34 reacts to the positive polarity electric field, so that as the spontaneous polarization direction of the second ferroelectric liquid crystal material 34 is changed to the same direction as the positive polarity electric field direction, the second ferroelectric liquid crystal layer 34 is driven under in-plane switching.

Meanwhile, as shown in FIG. 10, the first and the second ferroelectric liquid crystal layers 24 and 34 are formed to have a phase difference value identical to that of the related art compensation film. For instance, a phase difference value $\Delta nd$ of each of the first and the second ferroelectric liquid crystal layers 24 and 34 is about 10 nm to 150 nm. Herein, $\Delta n$ represents a refractive index anisotropy of each of the first and the second ferroelectric liquid crystal molecules, and d represents a thickness of each of the first and the second ferroelectric liquid crystal layers 24 and 34.

The nematic liquid crystal layer 50 has a switching angle of 90° and forms an interface with the first and the second ferroelectric liquid crystal layers 24 and 34. The nematic liquid crystal layer 50 is driven under in plane switching by the first or the second ferroelectric liquid crystal layers 24 and 34 as the spontaneous polarization direction of the nematic liquid crystal layer 50 is changed to the same direction as the electric field direction.

FIGS. 11A to 11D are sectional views sequentially illustrating a method of fabricating the in-plane switching mode liquid crystal display panel. Herein, the upper plate and the lower plate in FIG. 8 are manufactured by the method as in FIGS. 11A to 11D.

Figure 11A:
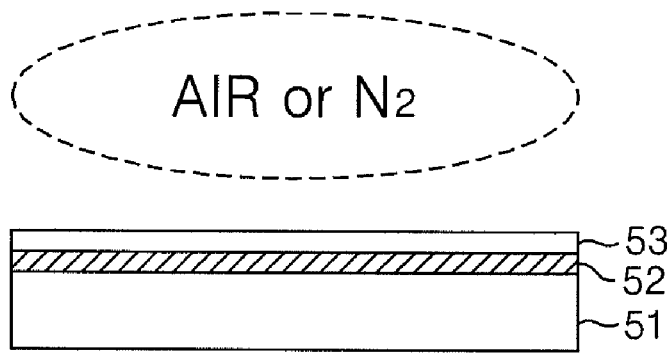
FIGS. 11A to 11D are sectional views sequentially illustrating a method of fabricating the in-plane switching mode liquid crystal display panel shown in FIG. 9.
Figure 11B:
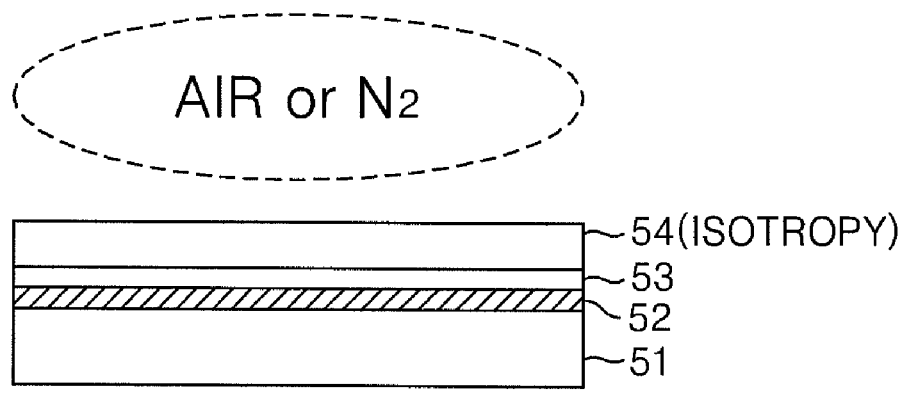

An electrode 52 and an amphiphilic alignment film 53 are formed on a substrate 51 as shown in FIG. 11A. The electrode 52 is made of a transparent conductive material such as an indium-tin-oxide (ITO). Since the amphiphilic alignment film 53 has electric negativity such as a polyamic acid, the amphiphilic alignment film 53 electrically represents a polarity and is made of an organic alignment material capable of aligning a liquid crystal material. The amphiphilic alignment film 53 is rubbed in order to settle an alignment direction of ferroelectric liquid crystal molecules.

Subsequently, a mixture in which the ferroelectric liquid crystal material and an organic solvent are uniformly mixed is applied to the substrate 51 such that the substrate 51 is exposed to an amphiphobic medium almost not representing electric polarity, and then the substrate 51 temperature is increased to between 140° C. to 160° C. to vaporize the organic solvent. As a result, a ferroelectric liquid crystal layer 54 of an isotropic phase is formed on the substrate 51. Herein, the amphiphobic medium may be selected from an atmosphere of air or nitrogen $N_2$, for example.

Figure 11C:
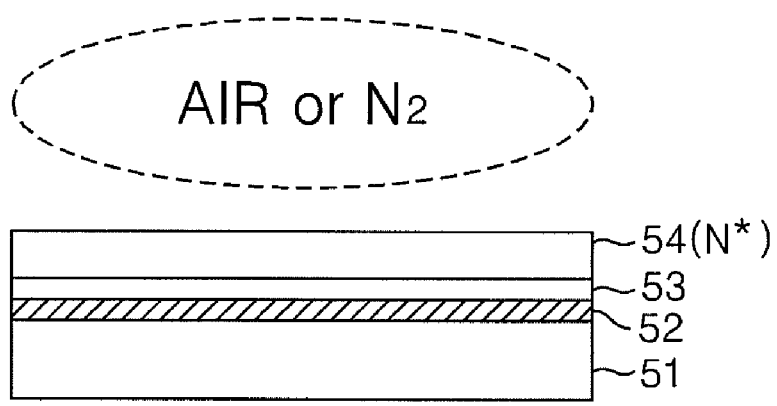
Figure 11D:
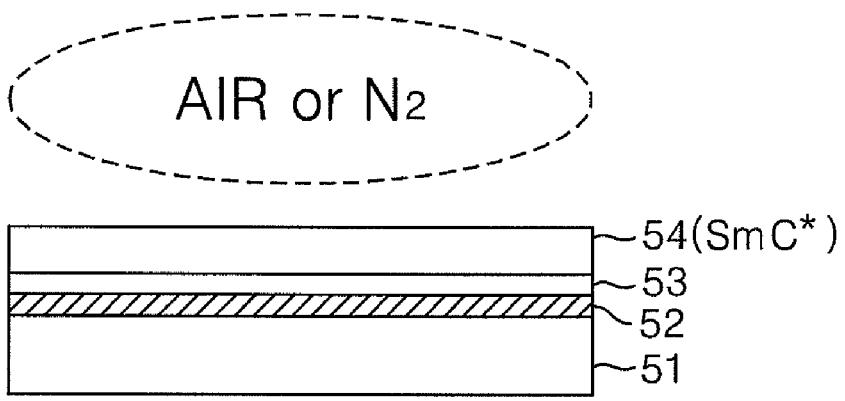
Figure 12:
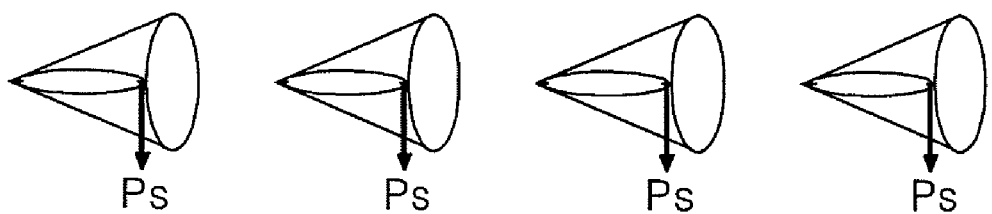
FIG. 12 is a configuration showing a ferroelectric liquid crystal material stabilized in a mono-stable state during a phase transition process of FIGS. 11A to 11D.

Next, the temperature of the substrate 51 is lowered to between 110° C. to 85° C. to permit a phase transition of the ferroelectric liquid crystal layer 54 from the isotropic phase to a chiral nematic phase (N*) as shown in FIG. 11C. Further, in order to permit a phase transition between the ferroelectric liquid crystal layer 54 from the chiral nematic phase (N*) to a chiral smectic C phase (Sm C*) as shown in FIG. 11D, the temperature of the glass substrate 51 is further lowered to between 80° C. to 50° C. At this time, as shown in FIG. 12, a spontaneous polarization Ps is generated in the liquid crystal molecules of the ferroelectric liquid crystal layer 54 during the phase transition to the chiral smectic C phase (Sm C*), and the direction of the spontaneous polarization Ps is directed to the amphiphilic alignment film 53. In other words, while the liquid crystal molecules of the ferroelectric liquid crystal layer 54 are subject to the phase transition to the chiral smectic C phase (Sm C*), the direction of the spontaneous polarization Ps is uniformly arranged to a mono-stable state without an external electric field being applied.

FIGS. 13A to 13D are sectional views sequentially illustrating a method of fabricating an in-plane switching mode liquid crystal display panel according to another embodiment of the present invention. Herein, the upper plate and the lower plate in FIG. 9 are manufactured by the method as in FIGS. 13A to 13D.

Figure 13A:
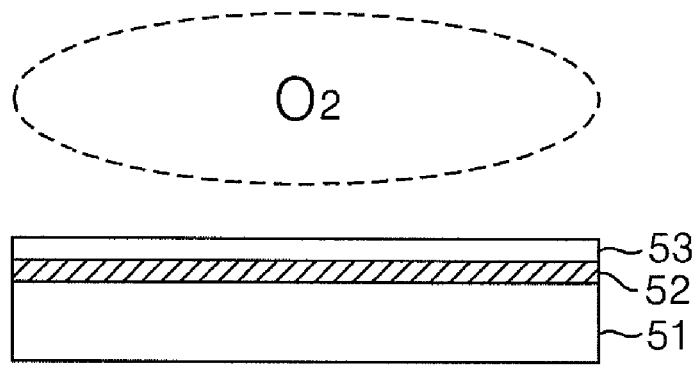
FIGS. 13A to 13D are sectional views sequentially illustrating a method of fabricating the in-plane switching mode liquid crystal display panel shown in FIG. 8.

An electrode 52 and an alignment film 53 are formed on a substrate 51 as shown in FIG. 13A. The electrode 52 is made of a transparent conductive material such as an indium-tin-oxide (ITO). The alignment film 53 is made of an organic alignment material such as a polyamic acid, and the alignment film 53 is rubbed in order to settle an alignment direction of ferroelectric liquid crystal molecules.

Figure 13B:
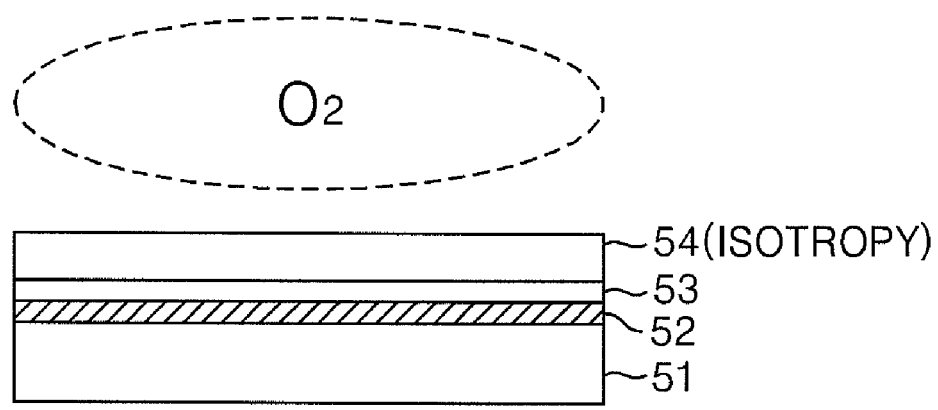

Subsequently, a mixture in which the ferroelectric liquid crystal material and an organic solvent are uniformly mixed is applied to the substrate 51, which is exposed under an amphiphobic medium, e.g., under an atmosphere of $H_2O$ or $O_2$, having a high electric negativity (i.e., a high polarity) compared to the alignment film 53 as shown in FIG. 13B, and a temperature of the substrate 51 is increased to between 140° C. to 160° C. to vaporize the organic solvent. As a result, a ferroelectric liquid crystal layer 54 of an isotropic phase is formed on the substrate 51.

Figure 13C:
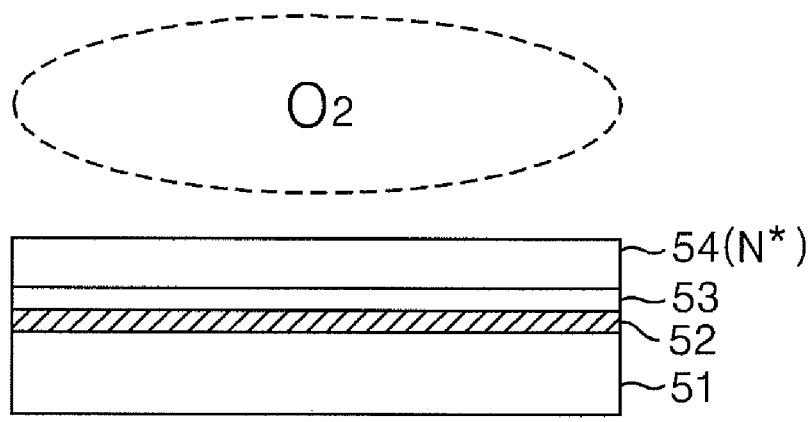
Figure 13D:
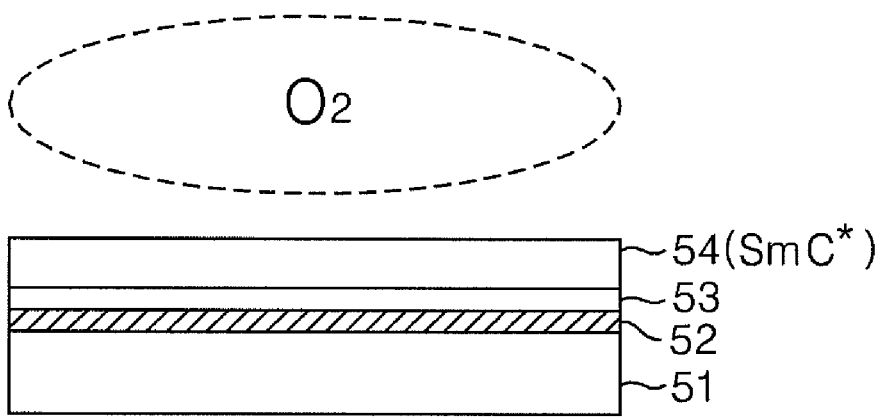

In order to produce a phase transition in the ferroelectric liquid crystal layer 54 from the isotropic phase to the chiral nematic phase (N*) as shown in FIG. 13C, the temperature of the substrate 51 is lowered to between 110° C. to 85° C. Further, in order to produce a phase transition in the ferroelectric liquid crystal layer 54 from the chiral nematic phase (N*) as shown in FIG. 13C to the chiral smectic C phase (Sm C*) as shown in FIG. 13D, the temperature of the substrate 51 is further lowered to between 80° C. to 50° C. At this time, as shown in FIG. 14, a spontaneous polarization Ps is generated in the liquid crystal molecules of the ferroelectric liquid crystal layer 54 during the phase transition process transited to the chiral smectic C phase (Sm C*), and the direction of the spontaneous polarization Ps is directed toward the amphiphilic medium on the opposite side to the alignment film 53. This is because the amphiphilic medium on opposite the alignment film 53 has a higher electrical negativity than the alignment film 53. In other words, while the liquid crystal molecules of the ferroelectric liquid crystal layer 54 are subject to the phase transition to the chiral smectic C phase (Sm C*), the direction of the spontaneous polarization Ps is uniformly arranged to a mono-stable state without an external electric field being applied.

Figure 15A:
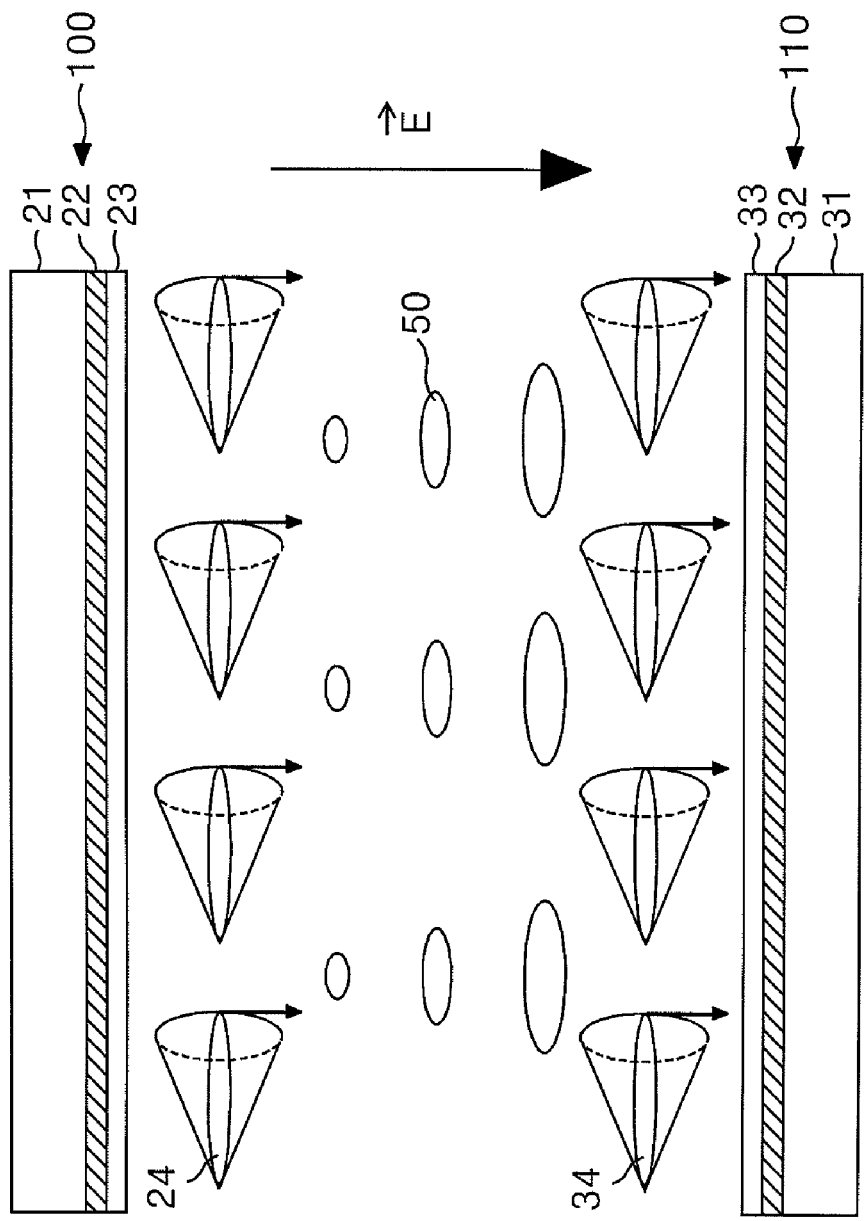
FIGS. 15A and 15B are detailed configurations showing a movement of in-plane switching mode of the ferroelectric liquid crystal material and the nematic system liquid crystal material shown in FIG. 9.
Figure 15B:
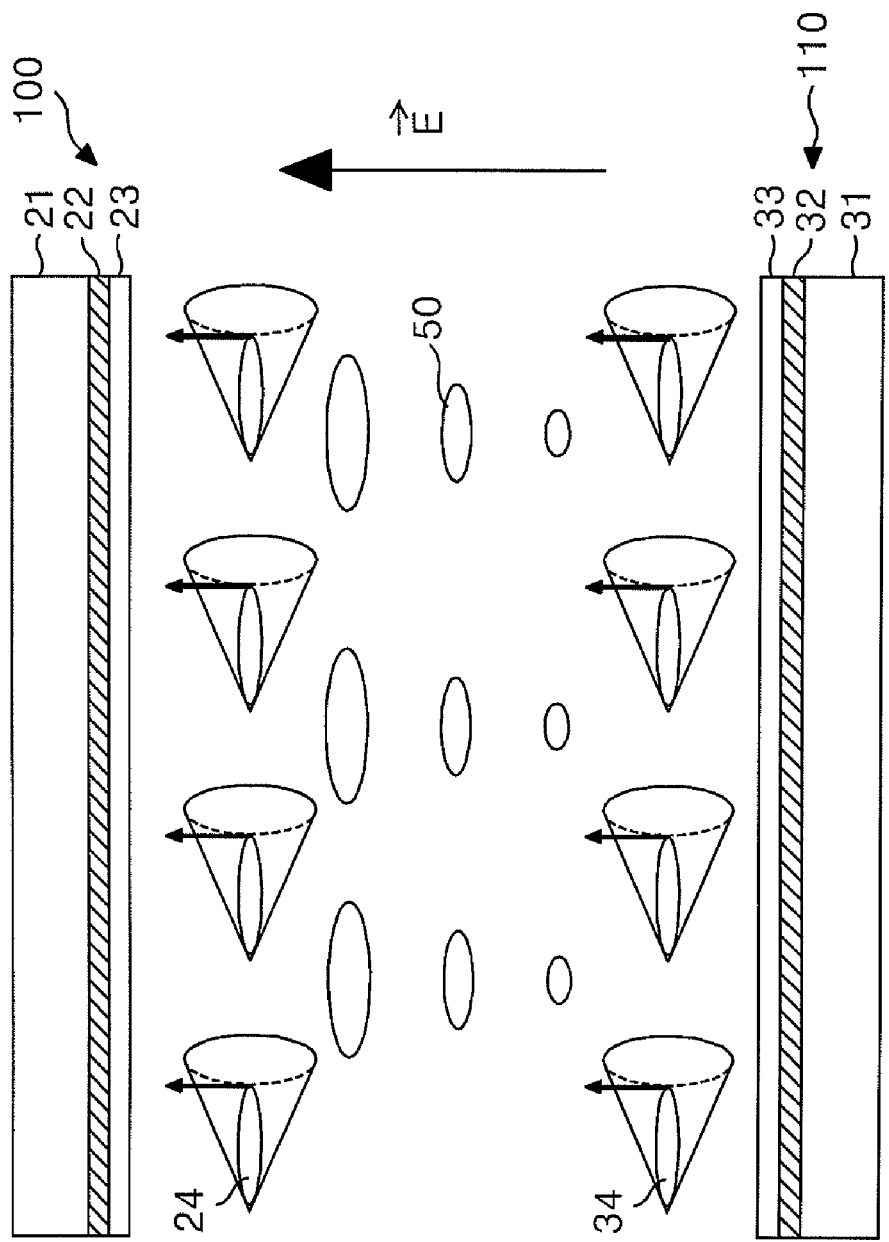

FIGS. 15A and 15B are sectional views illustrating a method of driving the liquid crystal display device according to one embodiment of the present invention. For instance, FIGS. 15A and 15B represent a change of the ferroelectric liquid crystal molecules arrangement of the half V-switching mode when respective external electric fields (E(+)) and (E(−)) of a positive polarity and a negative polarity are applied to the half V-switching mode ferroelectric liquid crystal molecule arrangement aligned in a direction corresponding to the negative polarity electric field (E(−)).

As shown in FIG. 15A, when a positive polarity electric field is applied to the liquid crystal display panel having the first and the second ferroelectric liquid crystal materials 24 and 34 and the nematic liquid crystal material, the spontaneous polarization direction of the first ferroelectric liquid crystal material 24 is changed to the same direction as the positive polarity electric field direction. The first ferroelectric liquid crystal material 24 is then driven in the in-plane direction and the nematic liquid crystal material adjacent to the first ferroelectric liquid crystal material 24 is driven under the in-plane switching. The second ferroelectric liquid crystal material 34 having the same spontaneous polarization direction as the positive polarity electric field direction does not react to the electric field and maintains an incipient arrangement state. At this time, as the nematic liquid crystal material 50 is switched in plane only by the first ferroelectric liquid crystal material 24, the nematic liquid crystal 50 becomes twisted in a vertical direction.

Furthermore, as shown in FIG. 15B, when a negative polarity electric field is applied to the liquid crystal display panel having the first and the second ferroelectric liquid crystal materials 24 and 34 and the nematic liquid crystal material, the spontaneous polarization direction of the second ferroelectric liquid crystal material 34 is changed to the same direction as the negative polarity electric field direction. The second ferroelectric liquid crystal material 34 is then driven in the in-plane direction and the nematic liquid crystal material adjacent to the second ferroelectric liquid crystal material 50 is driven under in plane switching. Further, the first ferroelectric liquid crystal material 24 having the same spontaneous polarization direction as the negative polarity electric field direction does not react to the electric field and maintains an incipient arrangement state. At this time, as the nematic liquid crystal material 50 is switched in plane only by the second ferroelectric liquid crystal material 34, the nematic liquid crystal 50 becomes twisted in a vertical direction.

The in-plane switching mode liquid crystal display device assures implementation of a wide viewing angle by virtue of in-plane driving of the nematic liquid crystal 50 as well as minimizing deterioration of the aperture ratio by applying an electric field to the liquid crystal 50 under a vertical electric field scheme. Further, since the nematic liquid crystal 50 is rapidly moved by the ferroelectric liquid crystal materials 24 and 34, it is possible to improve the response speed of the nematic liquid crystal 50.

FIG. 16 is a configuration showing a liquid crystal panel to which a half V-switching mode ferroelectric liquid crystal layer is driven by dot inversion, and FIG. 17 is a configuration showing a liquid crystal panel, in which a nematic liquid crystal layer between the half V-switching mode ferroelectric liquid crystal layers as shown in FIG. 8 or FIG. 9, is driven by dot inversion.

Figure 18A:
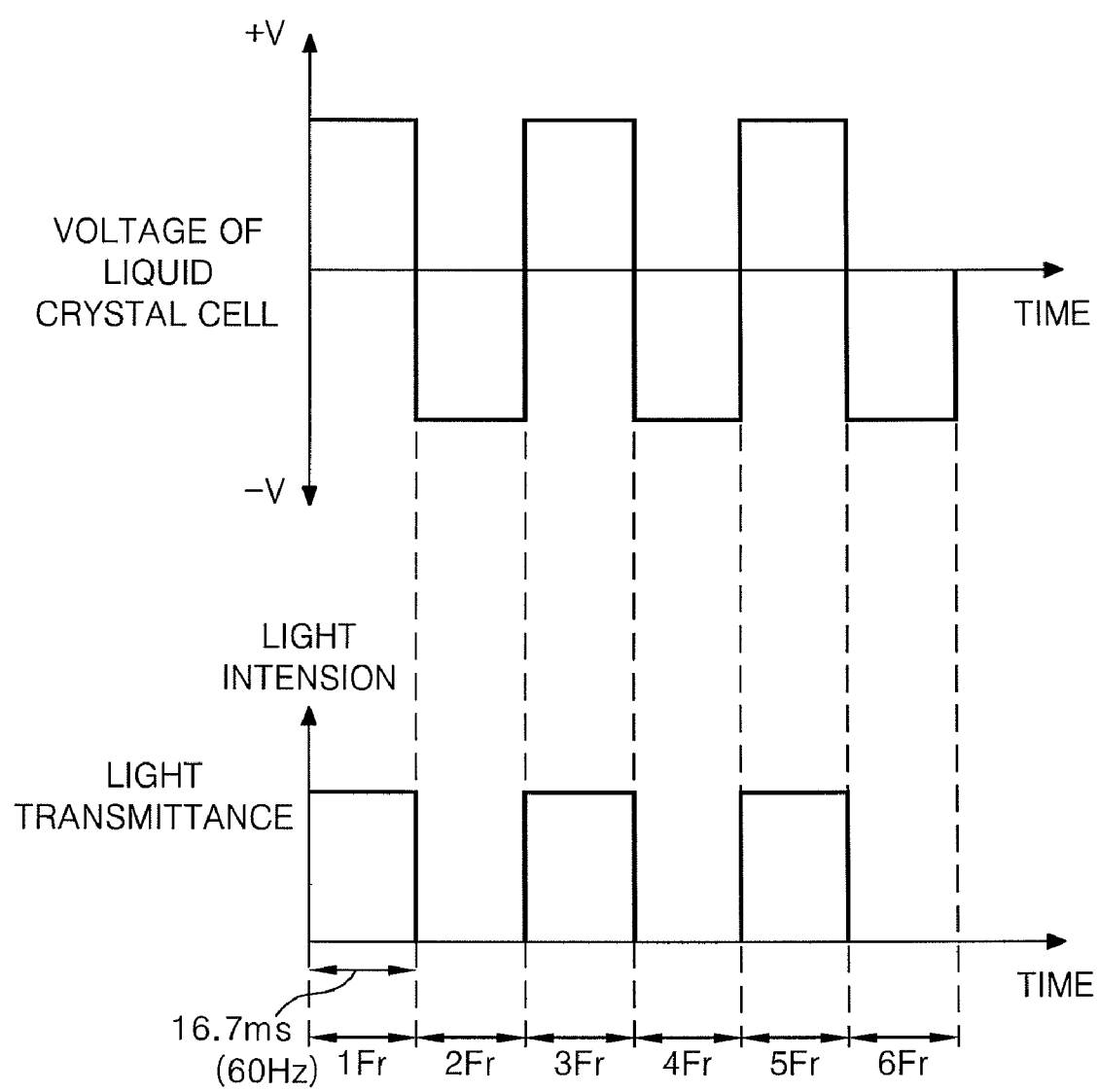
FIGS. 18A and 18B are graphs showing light transmittance of the liquid crystal panels shown in FIGS. 16 and 17, wherein the liquid crystal panels are driven by the dot inversion system, respectively.

As shown in FIG. 16, if a liquid crystal display device having a half V-switching mode ferroelectric liquid crystal cell aligned by a negative polarity electric field is driven by dot inversion, then the ferroelectric liquid crystal cells transmit light alternately one by one because the ferroelectric liquid crystal cell transmits light only in the positive polarity electric field. In other words, the odd liquid crystal cells of an odd horizontal line and the even ferroelectric liquid crystal cells of an even horizontal line transmit light in response to the positive polarity electric field (+) in an odd frame and intercept light in response to the negative polarity electric field (−) in an even frame. Even liquid crystal cells of an odd horizontal line and odd ferroelectric liquid crystal cells of an even horizontal line intercept light in response to the negative polarity electric field (−) in an odd frame and transmit light in response to the positive polarity electric field (+) in an even frame. At this time, as shown in FIG. 18A, 60 Hz data, i.e., the electric field of which polarity is inverted at each frame period, is applied to a free liquid crystal cell. The liquid crystal cell transmits light only in an odd frame period (1 Fr, 3 Fr, 5 Fr) to which the positive polarity electric field is applied. Accordingly, if the half V-switching mode ferroelectric liquid crystal cell is uniformly aligned under electric field through the whole panel and is driven in an inversion system, then because a visitor perceives light periodically at each frame period, the brightness of display picture is lowered and the display picture flickers.

On the other hand, as shown in FIG. 17, if the half V-switching mode liquid crystal display panel in which the nematic liquid crystal layer is between the first and the second ferroelectric liquid crystal layers is driven by dot inversion, then one of the first or the second ferroelectric liquid crystal layers is in-plane switched in the positive polarity electric field and the another is in-plane switched in the negative polarity electric field. For instance, the first ferroelectric liquid crystal layer is in-plane switched in the positive polarity electric field and the second ferroelectric liquid crystal layer is in-plane switched in the negative polarity electric field.

Figure 18B:
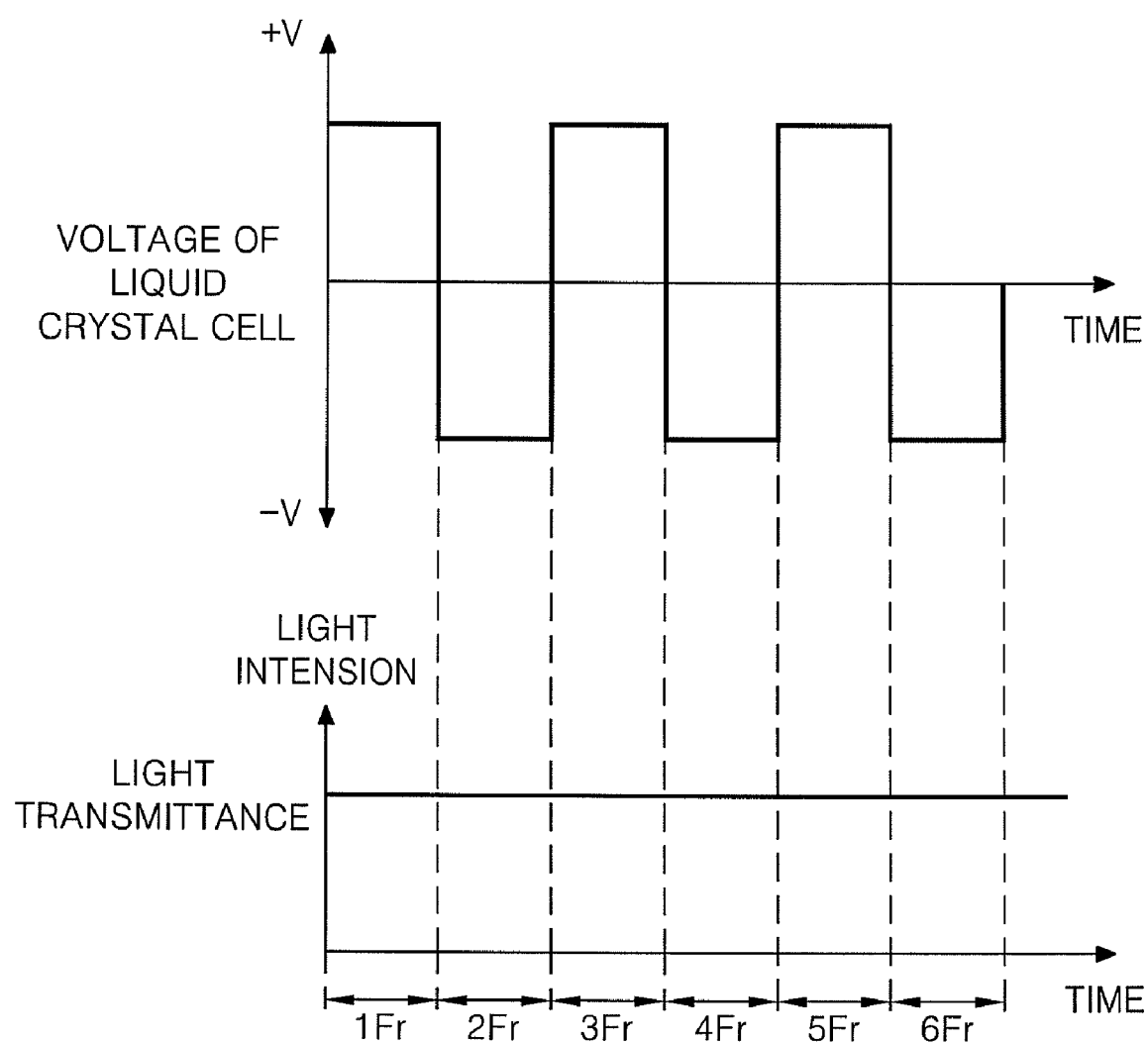

In other words, the odd liquid crystal cells of an odd horizontal line and the even ferroelectric liquid crystal cells of an even horizontal line transmit light in response to the positive polarity electric field (+) in an odd frame and transmit light in response to the negative polarity electric field (−) in an even frame. Even liquid crystal cells of an odd horizontal line and odd ferroelectric liquid crystal cells of an even horizontal line transmit light in response to the negative polarity electric field (−) in an odd frame and transmit light in response to the positive polarity electric field (+) in an even frame. At this time, as shown in FIG. 18B, 60 Hz data, i.e., the electric field of which polarity is inverted in each frame period, is applied to a free liquid crystal cell. The liquid crystal cell transmits light in an odd frame period (1 Fr, 3 Fr, 5 Fr) to which the positive polarity electric field is applied and transmits light in an even frame period (2 Fr, 4 Fr, 6 Fr) to which the negative polarity electric field is applied. Accordingly, even though the half V-switching mode ferroelectric liquid crystal cell is uniformly aligned under electric field through the whole panel and is driven in an inversion system, because a visitor perceives light periodically every frame period, the brightness of display picture is improved.

Figure 19B:
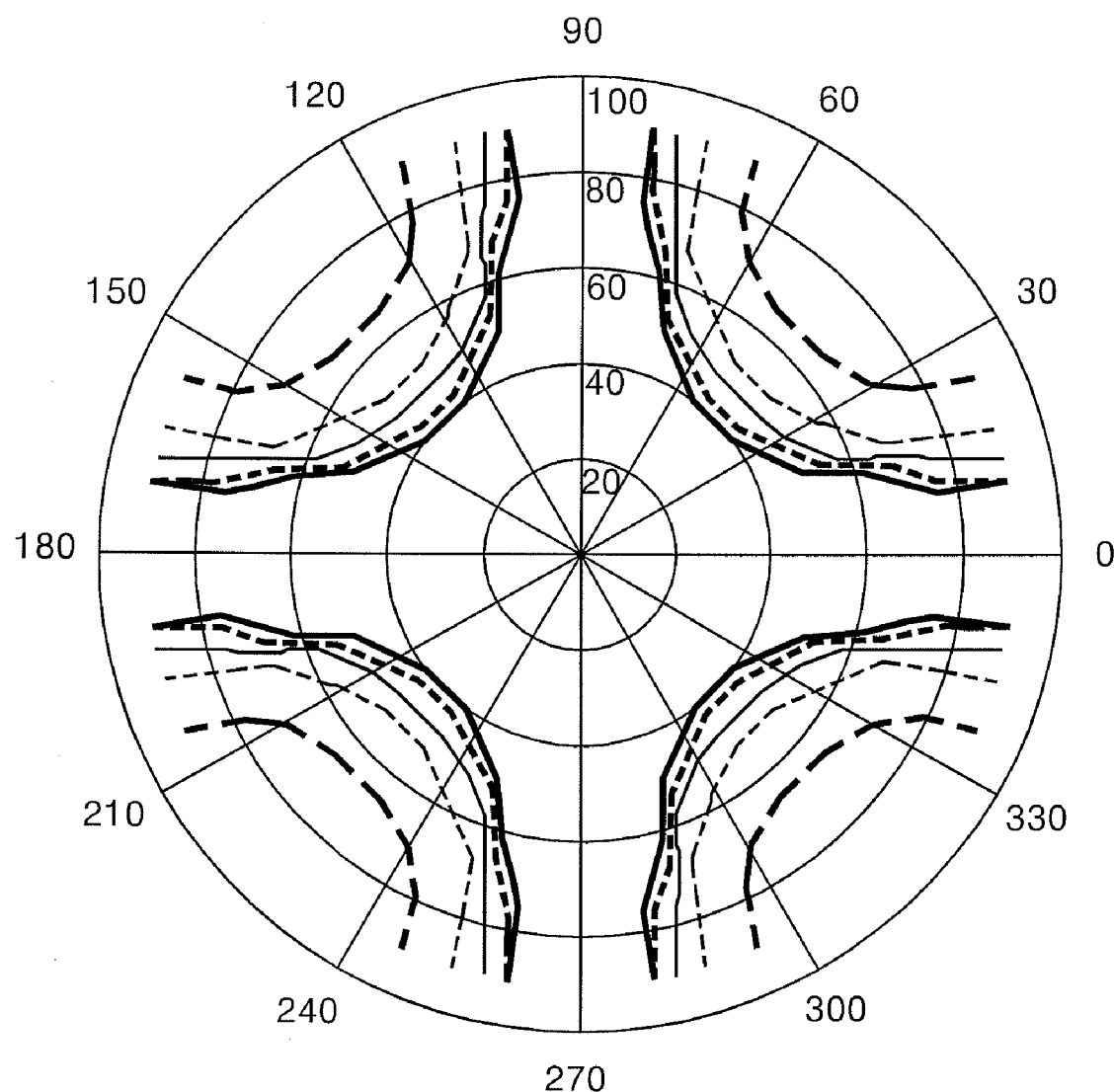

FIGS. 19A and 19B are configurations showing a viewing angle of a twisted nematic mode general liquid crystal display panel and the in-plane switching mode liquid crystal display panel according to the present invention, respectively. In FIGS. 19A and 19B, azimuth angles 90°, 270°, 180° and 0°, respectively, represent upper/lower/left/right viewing angles. Concentric circles represent inclination angles, which is inclined from a display surface to the declination angle.

As shown in FIG. 19A, the general twisted nematic mode liquid crystal display device can obtain contrast ratio of 100 at an inclination angle 10° for azimuth angles 45°, 135°, 225°, and 315°, and can obtain contrast ratio of 0 to 10 at inclination angles more than 50°. In other words, in the general twisted nematic mode liquid crystal display device, the range of viewing angles capable of obtaining a high contrast ratio is relatively narrow.

Figure 20A:
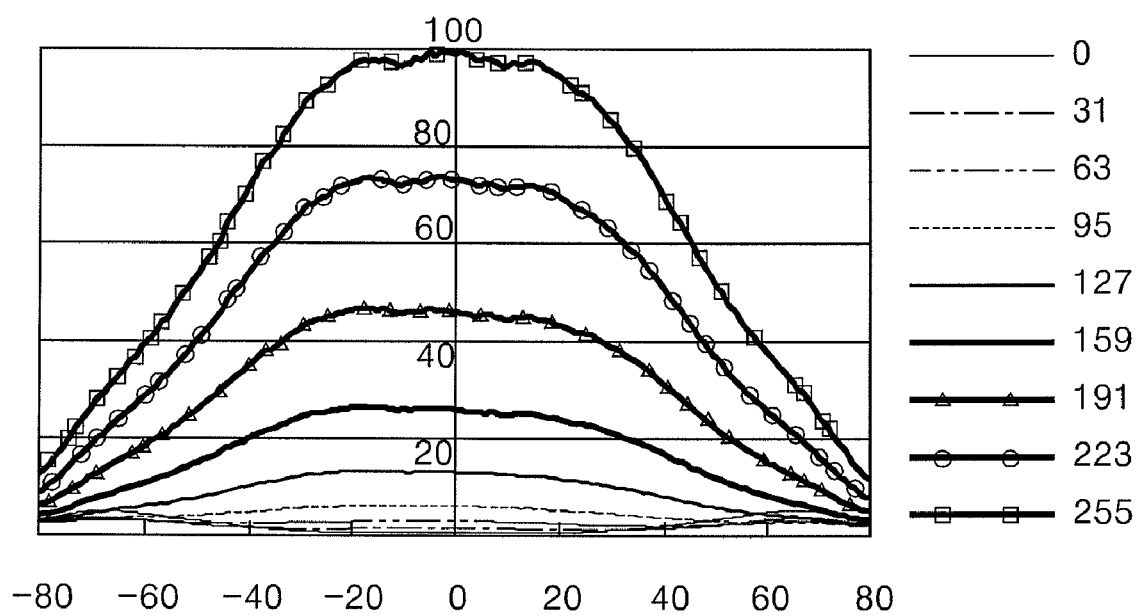
FIGS. 20A and 20B are graphs showing gray level inversion of the general twisted nematic mode liquid crystal display panel.
Figure 20B:
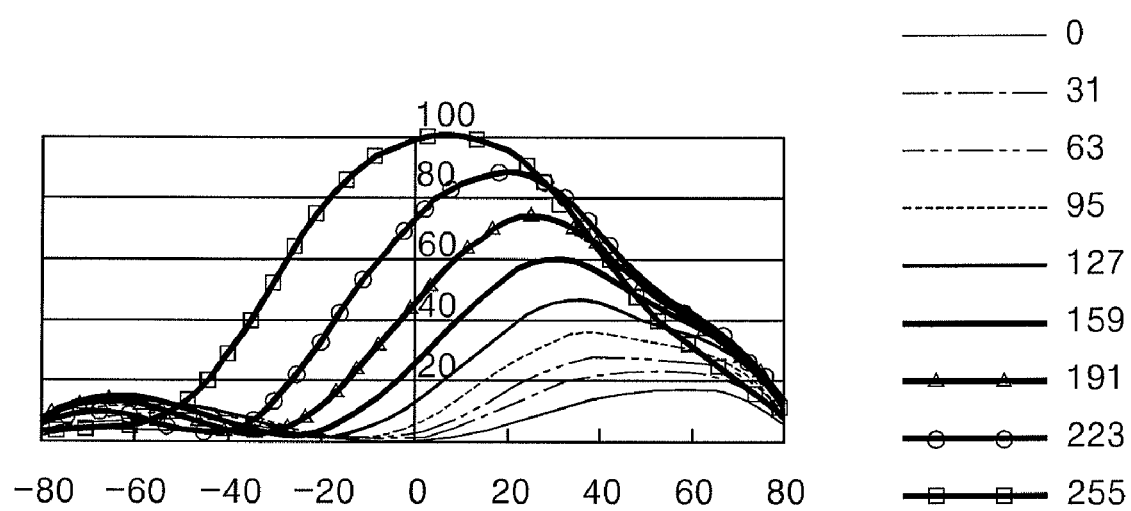

Further, in the general twisted nematic mode liquid crystal display device brightness in accordance with the viewing angle of upper/lower/left/right directions should be increased by an applied voltage. However, gray level inversion occurs, decreasing the brightness even through the applied voltage is increased. For instance, as shown in FIG. 20A, brightness of a "0" gray level is increased more than that of a "95" gray level near about 50° in left/right directions. Also, as shown in FIG. 20B, brightness of a "255" gray level is decreased more than that of a "223" gray level, and brightness of a "191" gray level is decreased more than that of a "63" gray level, near about 20° to 30° in upper/lower directions.

Figure 21:
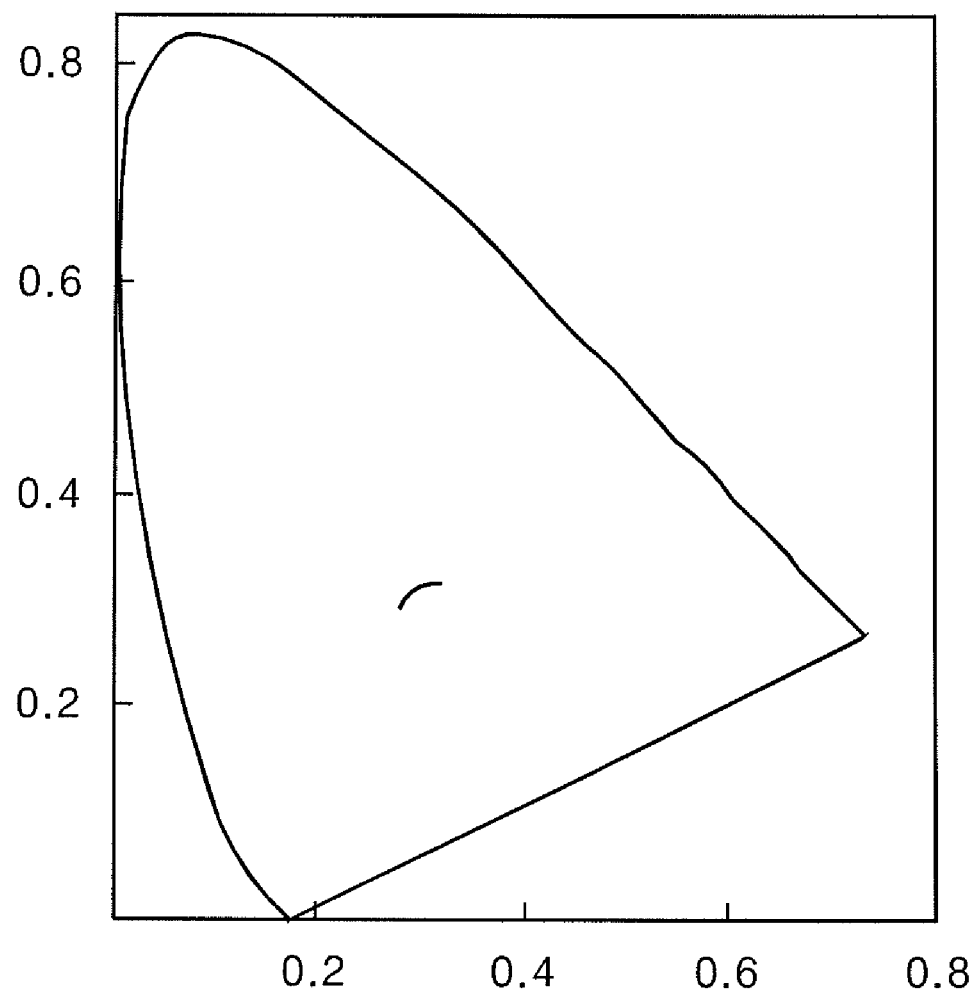
FIG. 21 is a graph showing color coordinates in the in-plane switching mode liquid crystal display device according to one embodiment of the present invention.

As shown in FIG. 19B, the in-plane switching mode liquid crystal display device according to the present invention can obtain contrast ratio of 100 at an inclination angle 40° for azimuth angles 45°, 135°, 225°, and 315°, and can obtain contrast ratio of 10 at an inclination angle 70°. Moreover, since the viewing angle is symmetric in the upper/lower/left/right directions, the range of upper/lower/left/right viewing angles is wide. In other words, the present in-plane switching mode liquid crystal display device has a relatively wider viewing angle and has a higher contrast ratio compared to the general twisted nematic mode liquid crystal display device. Furthermore, since a color coordinate in the in-plane switching mode liquid crystal display device is located adjacently with a coordinate of standard white light ([x,y]=[0.329, 0.333]) as shown in FIG. 21, adjustment of the white balance is easy.

As described above, in the in-plane switching mode liquid crystal display device, the method of fabricating the same, and the method of driving the same, each of the first and the second ferroelectric liquid crystal layers formed in the upper and lower substrates, respectively, reacts to the electric fields of opposite polarities, so that the liquid crystal molecules of a nematic liquid crystal layer is driven under in plane switching. As set forth above, the first and the second ferroelectric liquid crystal layer react to the opposite polarity electric fields, thereby permitting a picture in the entire frame irrespective of the polarity of the voltage applied thereto. Further, the nematic liquid crystal material is in-plane switched by the ferroelectric liquid crystal layer and the phase difference of the ferroelectric liquid crystal layer is identical to that of a compensation film. Accordingly, it is possible to prevent light leakage generated in the lateral surface of the polarizing plate without using the compensation film.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A method of driving a liquid crystal display device having opposing substrates with opposing electrodes thereon and a multilayer liquid crystal layer disposed between the electrodes, the multilayer liquid crystal layer containing opposing layers of a ferroelectric liquid crystal molecules and a middle layer therebetween of a nematic liquid crystal molecules, the method comprising:

applying an electric field to the opposing layers using the opposing electrodes; and in-plane driving liquid crystal molecules in the middle layer by permitting one of the opposing layers to react to the electric field, wherein the opposing layers are driven in a half V-switching mode, and their spontaneous polarization directions are different from each other so that one of the opposing layers is react to a positive electric field and the other one of the opposing layers is react to a negative electric field, and wherein the in-plane switching mode liquid crystal display is driven by a dot inversion in that the positive electric field and the negative electric field are applied to adjacent liquid crystal cells at the same time, so that the positive electric field is applied to the multilayer liquid crystal layer of a first liquid crystal cell in an odd frame and the negative electric field is applied to the multilayer liquid crystal layer of a second liquid crystal cell adjacent to the first liquid crystal cell in the odd frame.

2. The method according to claim 1, wherein the first liquid crystal cell comprises a odd liquid crystal cell of an odd horizontal line and a even liquid crystal cell of an even horizontal line, and the second liquid crystal cell comprises a even liquid crystal cell of the odd horizontal line and a odd liquid crystal cell of the even horizontal line.

3. The method according to claim 1, wherein the first liquid crystal cell transmits light in response to the positive polarity electric field in the odd frame and transmits light in response to the negative polarity electric field in an even frame, and the second liquid crystal cell transmits light in response to the negative polarity electric field in the odd frame and transmits light in response to the positive polarity electric field in the even frame.

* * * * *

UNITED STATES PATENT AND TRADEMARK OFFICE
CERTIFICATE OF CORRECTION

PATENT NO.       : 7,808,604 B2
APPLICATION NO.  : 12/253546
DATED            : October 5, 2010
INVENTOR(S)      : Su Seok Choi et al.

Page 1 of 1

It is certified that error appears in the above-identified patent and that said Letters Patent is hereby corrected as shown below:

In column 10, claim 1, line 63, after "A method of driving" replace "a liquid crystal" with --an inplane switching mode liquid crystal--.

In column 11, claim 1, line 6, after "layer by permitting" insert --at least any--.

Signed and Sealed this
Fifteenth Day of February, 2011

David J. Kappos
*Director of the United States Patent and Trademark Office*